(12) United States Patent
Uyama et al.

(10) Patent No.: US 10,221,777 B2
(45) Date of Patent: Mar. 5, 2019

(54) GAS TURBINE COMBUSTION CONTROL DEVICE AND COMBUSTION CONTROL METHOD AND PROGRAM THEREFOR

(71) Applicant: MITSUBISHI HITACHI POWER SYSTEMS, LTD., Kanagawa (JP)

(72) Inventors: Noriyoshi Uyama, Yokohama (JP); Hideki Haruta, Yokohama (JP); Wataru Akizuki, Yokohama (JP); Yuji Komagome, Yokohama (JP); Koji Takaoka, Yokohama (JP); Yoshifumi Iwasaki, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 120 days.

(21) Appl. No.: 15/278,395

(22) Filed: Sep. 28, 2016

(65) Prior Publication Data

US 2017/0089268 A1 Mar. 30, 2017

Related U.S. Application Data

(63) Continuation-in-part of application No. 15/125,331, filed as application No. PCT/JP2015/058950 on Mar. 24, 2015.

(30) Foreign Application Priority Data

Mar. 25, 2014 (JP) .................................. 2014-061915

(51) Int. Cl.
*F02C 9/18* (2006.01)
*F02C 9/26* (2006.01)
(Continued)

(52) U.S. Cl.
CPC .................. *F02C 9/52* (2013.01); *F02C 7/04* (2013.01); *F02C 9/18* (2013.01); *F02C 9/28* (2013.01);
(Continued)

(58) Field of Classification Search
CPC ...... F02C 9/18; F02C 9/26; F02C 9/28; F02C 9/32; F02C 9/52; F02C 9/54; F05D 2270/31; F05D 2270/303
See application file for complete search history.

(56) References Cited

U.S. PATENT DOCUMENTS

2006/0005526 A1* 1/2006 Tanaka ..................... F02C 7/228
60/39.27
2007/0089395 A1* 4/2007 Fujii ....................... F02C 9/263
60/39.281
(Continued)

FOREIGN PATENT DOCUMENTS

JP 8-178290 7/1996
JP 9-291833 11/1997
(Continued)

OTHER PUBLICATIONS

International Search Report dated Jun. 23, 2015 in International Application No. PCT/JP2015/058950 (with English translation).
(Continued)

*Primary Examiner* — William H Rodriguez
(74) *Attorney, Agent, or Firm* — Wenderoth, Lind & Ponack, L.L.P.

(57) ABSTRACT

A combustion control device is installed in a gas turbine including a compressor, a combustor, a turbine, a turbine bypass pipe through which compressed air from a casing is discharged to a turbine downstream part so as to bypass the turbine, and a turbine bypass valve that regulates a turbine bypass flow rate of the compressed air. The combustion control device includes: a fuel distribution setting unit that sets a turbine inlet temperature or a turbine inlet temperature-equivalent control variable on the basis of input data, and sets fuel distribution ratios on the basis of the turbine inlet temperature or the turbine inlet temperature-equivalent control variable; and a fuel valve opening setting section that
(Continued)

sets the valve openings of fuel regulating valves. The fuel distribution setting unit includes correction means for modifying the fuel distribution ratios.

13 Claims, 19 Drawing Sheets

(51) Int. Cl.
- *F02C 9/52* (2006.01)
- *F02C 7/04* (2006.01)
- *F02C 9/28* (2006.01)
- *F02C 9/54* (2006.01)

(52) U.S. Cl.
CPC ............... *F02C 9/54* (2013.01); *F02C 9/26* (2013.01); *F05D 2270/08* (2013.01); *F05D 2270/303* (2013.01); *F05D 2270/31* (2013.01); *F05D 2270/71* (2013.01)

(56) References Cited

U.S. PATENT DOCUMENTS

| | | | | |
|---|---|---|---|---|
| 2007/0271024 | A1* | 11/2007 | Fujii | F02C 9/28 701/100 |
| 2009/0193788 | A1* | 8/2009 | Szepek | H04B 17/345 60/39.281 |
| 2009/0271085 | A1* | 10/2009 | Buchalter | F23N 1/002 701/100 |
| 2010/0174466 | A1* | 7/2010 | Davis, Jr. | F02C 7/22 701/100 |
| 2010/0198419 | A1* | 8/2010 | Sonoda | F01D 17/16 700/290 |
| 2012/0023953 | A1* | 2/2012 | Thomas | F02C 7/228 60/772 |
| 2015/0040571 | A1* | 2/2015 | Coomar | F02C 9/28 60/772 |
| 2016/0326967 | A1* | 11/2016 | Yamamoto | F02C 9/28 |
| 2017/0002748 | A1* | 1/2017 | Sonoda | F02C 9/20 |
| 2017/0211409 | A1* | 7/2017 | Saito | F01D 17/16 |

FOREIGN PATENT DOCUMENTS

| | | |
|---|---|---|
| JP | 2004-116384 | 4/2004 |
| JP | 2007-77867 | 3/2007 |
| JP | 4119909 | 7/2008 |
| JP | 2011-137390 | 7/2011 |
| JP | 2012-26449 | 2/2012 |
| JP | 2013-53552 | 3/2013 |
| JP | 2013-209917 | 10/2013 |

OTHER PUBLICATIONS

Written Opinion of the International Searching Authority dated Jun. 23, 2015 in International Application No. PCT/JP2015/058950 (with English translation).

* cited by examiner

3 - Combustor
20 - Inlet Guide Vane (IGV)
21 - IGV Driving Unit

INTAKE AIR TEMPERATURE TIN

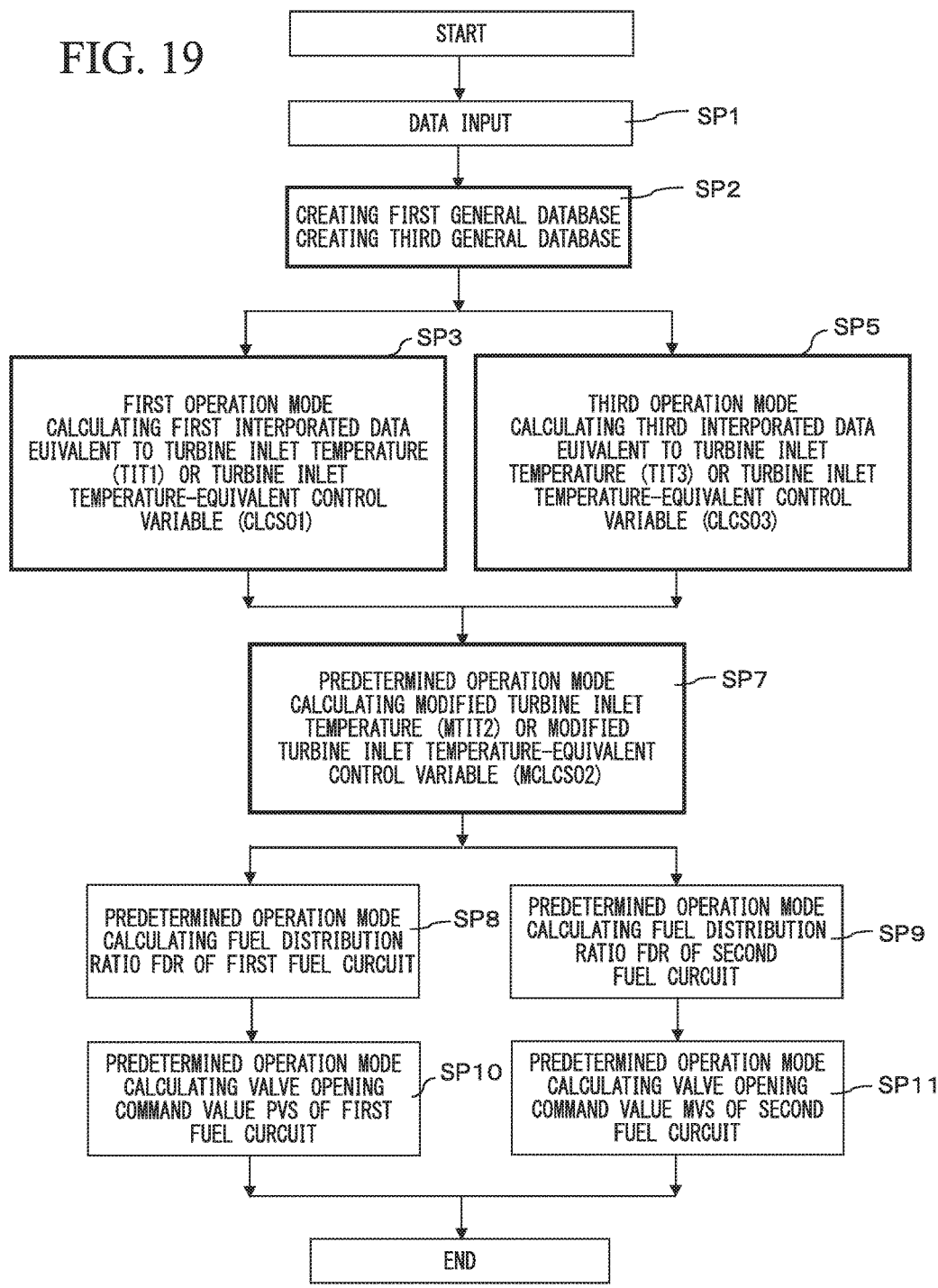

GAS TURBINE COMBUSTION CONTROL DEVICE AND COMBUSTION CONTROL METHOD AND PROGRAM THEREFOR

TECHNICAL FIELD

The present invention relates to gas turbine combustion control device and combustion control method and a program therefor, and more particularly, to a combustion control device, a combustion control method, and a program that are applied to a gas turbine in anti-icing operation or turndown operation (partial load operation).

BACKGROUND ART

Commonly, the flow rate of combustion air supplied to a gas turbine is controlled through the opening of inlet guide vanes (IGVs) etc. The opening of the IGVs is smaller during no load operation or partial load operation of the gas turbine than during rated load operation. Especially when the atmospheric temperature falls in winter, an icing phenomenon of moisture in the air forming ice may occur at the inlet part of the compressor. When the icing phenomenon occurs, not only is the reliability of the gas turbine adversely affected due to the resulting decrease in output and efficiency of the gas turbine, but also the blades and vanes in a front stage of the compressor may be damaged as the accumulated ice falls away.

To avoid this phenomenon, there have been proposed various gas turbines and operation methods thereof for anti-icing operation in which the temperature of intake air entering the compressor is raised. Patent Literature 1 shows one example of a bleed air circulation method for anti-icing purposes, in which part of casing air is extracted from a casing where air having been compressed in the compressor and reached high temperature is stored, and that part of casing air is circulated to an air intake facility on the inlet side of the compressor to raise the temperature of air entering the compressor and thereby prevent the icing phenomenon.

Regarding a gas turbine that performs normal operation without anti-icing operation, Patent Literature 2 shows one example of a system and a method in which combustion in a gas turbine is controlled on the basis of the turbine inlet temperature.

CITATION LIST

Patent Literature

Patent Literature 1: Japanese Patent Laid-Open No. H9-291833
Patent Literature 2: Japanese Patent No. 4119909

SUMMARY OF INVENTION

Technical Problem

When the operation of a gas turbine is switched from normal operation to anti-icing operation based on the bleed air circulation method, part of the casing air is extracted and returned to the inlet side of the compressor. In this case, the amount of air supplied to the combustor decreases, so that a shift occurs in relations between the gas turbine output and control variables and the combustion control becomes unstable, which may have an adverse effect, such as generation of combustion oscillation, on the gas turbine control.

In gas turbines intended for power generation, daily start and stop (DSS) operation is performed to respond to variations in electric power demand between the daytime and the nighttime. However, repeatedly starting and stopping a gas turbine according to variations in electric power demand is not desirable in terms of the efficiency and the service life of the gas turbine. Therefore, a device is desired that can widen the range of turndown (output lower limit value) as much as possible and allows operation even at a time of low electric power demand.

An object of the present invention is to provide a gas turbine combustion control device that is capable of stable combustion control even in the case of anti-icing operation and realizes stable operation while meeting emission regulation values even during turndown operation (partial load operation), and to further provide a gas turbine combustion control method and a program therefor.

Solution to Problem (1) A gas turbine combustion control device according to a first aspect of the present invention is a gas turbine combustion control device that is installed in a gas turbine including: a compressor having inlet guide vanes; a combustor having a plurality of fuel nozzles; a turbine; a bleed air pipe through which bleed air from a casing is returned to an inlet of an air intake facility; and an air bleed valve that is mounted on the bleed air pipe and regulates the amount of bleed air extracted, the gas turbine combustion control device being configured to set fuel distribution ratios for fuel circuits of fuel supplied to the combustor, and including: a fuel distribution setting unit that sets a turbine inlet temperature or a turbine inlet temperature-equivalent control variable computed on the basis of input data, and sets the fuel distribution ratios on the basis of the turbine inlet temperature or the turbine inlet temperature-equivalent control variable; and a valve opening setting unit that sets the valve openings of fuel regulating valves provided in the fuel circuits on the basis of the fuel distribution ratios, wherein the fuel distribution setting unit includes correction means for modifying the fuel distribution ratios on the basis of the amount of bleed air extracted.

(2) A gas turbine combustion control device according to a second aspect of the present invention is the gas turbine combustion control device according to (1), wherein the fuel distribution setting unit includes: a turbine inlet temperature-equivalent control variable setting section that calculates first interpolated data equivalent to the turbine inlet temperature or the turbine inlet temperature-equivalent control variable in a first operation mode that is an operation mode in which the gas turbine does not perform anti-icing operation, and second interpolated data equivalent to the turbine inlet temperature or the turbine inlet temperature-equivalent control variable in a second operation mode that is an anti-icing operation mode in which a predetermined amount of bleed air is set and part of the bleed air from the casing is circulated to the air intake facility; and a fuel distribution correction section that, using the first interpolated data and the second interpolated data, modifies the fuel distribution ratios in a predetermined operation mode on the basis of a specific parameter determined by the amount of bleed air extracted in the predetermined operation mode that is an anti-icing operation mode in which an amount of bleed air required for stable combustion is selected and that amount of bleed air is circulated to the air intake facility.

(3) A gas turbine combustion control device according to a third aspect of the present invention is the gas turbine combustion control device according to (1), wherein the fuel distribution setting unit includes: an interpolated output data calculation section that calculates first interpolated output data related to an output during no load operation in a first operation mode that is an operation mode in which the gas turbine does not perform anti-icing operation, and second interpolated output data related to an output during rated load operation in the first operation mode; an interpolated output data correction section that modifies the first interpolated output data and the second interpolated output data on the basis of a specific parameter determined by the amount of bleed air extracted in a predetermined operation mode that is an anti-icing operation mode in which an amount of bleed air required for stable combustion is selected and that amount of bleed air is circulated to the air intake facility; a control variable calculation section that calculates a turbine inlet temperature-equivalent control variable on the basis of the first modified interpolated output data and the second modified interpolated output data that have been modified; and a fuel distribution calculation section that calculates the fuel distribution ratios for the respective fuel circuits on the basis of the turbine inlet temperature-equivalent control variable.

(4) A gas turbine combustion control device according to a fourth aspect of the present invention is the gas turbine combustion control device according to (3), wherein the interpolated output data correction section includes: a correction factor calculation section that calculates an output correction factor that varies according to the specific parameter; and an interpolated output data modification section that modifies the first interpolated output data and the second interpolated output data using the output correction factor.

(5) A gas turbine combustion control device according to a fifth aspect of the present invention is the gas turbine combustion control device according to (2), wherein the fuel distribution correction section includes: a control variable interpolation section that, using the first interpolated data and the second interpolated data, calculates a modified turbine inlet temperature or a modified turbine inlet temperature-equivalent control variable in the predetermined operation mode on the basis of the specific parameter; and a fuel distribution calculation section that calculates the fuel distribution ratios for the respective fuel circuits on the basis of the modified turbine inlet temperature or the modified turbine inlet temperature-equivalent control variable.

(6) A gas turbine combustion control device according to a sixth aspect of the present invention is the gas turbine combustion control device according to (2) or (5), wherein the turbine inlet temperature-equivalent control variable setting section includes: means for calculating first interpolated output data related to an output during no load operation in the first operation mode and second interpolated output data related to an output during rated load operation in the first operation mode; means for calculating first interpolated data equivalent to the turbine inlet temperature-equivalent control variable in the first operation mode using the first interpolated output data and the second interpolated output data; means for calculating third interpolated output data related to an output during no load operation in the second operation mode and fourth interpolated output data related to an output during rated load operation in the second operation mode; and means for calculating second interpolated data equivalent to the turbine inlet temperature-equivalent control variable in the second operation mode using the third interpolated output data and the fourth interpolated output data.

(7) A gas turbine combustion control method according to a seventh aspect of the present invention is a gas turbine combustion control method for a gas turbine including: a compressor having inlet guide vanes; a combustor having a plurality of fuel nozzles; a turbine; a bleed air pipe through which bleed air from a casing is returned to an inlet of an air intake facility; an air bleed valve that is mounted on the bleed air pipe and regulates the amount of bleed air extracted; and a gas turbine combustion control device configured to set fuel distribution ratios for circuits of fuel supplied to the combustor, the gas turbine combustion control method including the steps of: calculating first interpolated data equivalent to a turbine inlet temperature or a turbine inlet temperature-equivalent control variable in a first operation mode computed on the basis of input data on the first operation mode that is an operation mode in which the gas turbine does not perform anti-icing operation; calculating second interpolated data equivalent to a turbine inlet temperature or a turbine inlet temperature-equivalent control variable in a second operation mode computed on the basis of input data on the second operation mode that is an anti-icing operation mode in which a predetermined amount of bleed air is set and part of the bleed air from the casing is circulated to the air intake facility; using the first interpolated data and the second interpolated data, calculating a modified turbine inlet temperature or a modified turbine inlet temperature-equivalent control variable in a predetermined operation mode on the basis of a specific parameter determined by the amount of bleed air extracted in the predetermined operation mode that is an anti-icing operation mode in which an amount of bleed air required for stable combustion is selected and that amount of bleed air is circulated to the air intake facility; calculating the fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

(8) A gas turbine combustion control method according to an eighth aspect of the present invention is a gas turbine combustion control method for a gas turbine including: a compressor having inlet guide vanes; a combustor having a plurality of fuel nozzles; a turbine; a bleed air pipe through which bleed air from a casing is returned to an inlet of an air intake facility; an air bleed valve that is mounted on the bleed air pipe and regulates the amount of bleed air extracted; and a gas turbine combustion control device configured to set fuel distribution ratios for circuits of fuel supplied to the combustor, the gas turbine combustion control method including the steps of: calculating first interpolated output data corresponding to a turbine inlet temperature related to an output during no load operation on the basis of input data on a first operation mode that is an operation mode in which the gas turbine does not perform anti-icing operation; calculating second interpolated output data corresponding to a turbine inlet temperature related to an output during rated load operation on the basis of input data on the first operation mode; calculating an output correction factor on the basis of a specific parameter determined by the amount of bleed air extracted in a predetermined operation mode that is an anti-icing operation mode in which an amount of bleed air required for stable combustion is selected and that amount of bleed air is circulated to the air intake facility; calculating first modified interpolated output data by modifying the first interpolated output data on the basis of the output correction factor; calculating second modified interpolated output data by modifying the second interpolated output data on the basis of the output correction factor; using the first modified interpolated output data and the second modified interpolated output data, calculating a turbine inlet temperature-equivalent control variable on the basis of a turbine output in the predetermined operation mode; calculating the fuel distribution ratios for the respective fuel circuits in the predetermined operation mode on the basis of the turbine inlet temperature-equivalent control variable; and setting valve openings for the respective fuel circuits on the basis of the fuel distribution ratios.

(9) A gas turbine combustion control method according to a ninth aspect of the present invention is a gas turbine combustion control method for a gas turbine including: a compressor having inlet guide vanes; a combustor having a plurality of fuel nozzles; a turbine; a bleed air pipe through which bleed air from a casing is returned to an inlet of an air intake facility; an air bleed valve that is mounted on the bleed air pipe and regulates the amount of bleed air extracted; and a gas turbine combustion control device configured to set fuel distribution ratios for circuits of fuel supplied to the combustor, the gas turbine combustion control method including the steps of: creating a database on the basis of input data on a first operation mode that is an operation mode in which the gas turbine does not perform anti-icing operation, and a database on the basis of input data on a second operation mode that is an anti-icing operation mode in which a predetermined amount of bleed air is set and part of the bleed air from the casing is circulated to the air intake facility; calculating first interpolated data equivalent to a turbine inlet temperature or a turbine inlet temperature-equivalent control variable in the first operation mode on the basis of the database; calculating second interpolated data equivalent to a turbine inlet temperature or a turbine inlet temperature-equivalent control variable in the second operation mode on the basis of the database; using the first interpolated data and the second interpolated data, calculating a modified turbine inlet temperature or a modified turbine inlet temperature-equivalent control variable in a predetermined operation mode on the basis of a specific parameter determined by the amount of bleed air extracted in the predetermined operation mode that is an anti-icing operation mode in which an amount of bleed air required for stable combustion is selected and that amount of bleed air is circulated to the air intake facility; calculating the fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

(10) A gas turbine combustion control device according to a tenth aspect of the present invention is a gas turbine combustion control device that is installed in a gas turbine including: a compressor having inlet guide vanes; a combustor having a plurality of fuel nozzles; a turbine; a turbine bypass pipe through which compressed air from a casing is discharged to a turbine downstream part so as to bypasses the turbine; and a turbine bypass valve that is mounted on the turbine bypass pipe and regulates a turbine bypass flow rate of the compressed air, the gas turbine combustion control device being configured to set fuel distribution ratios for fuel circuits of fuel supplied to the combustor, and comprising: a fuel distribution setting unit that sets a turbine inlet temperature or a turbine inlet temperature-equivalent control variable computed on the basis of input data, and sets the fuel distribution ratios on the basis of the turbine inlet temperature or the turbine inlet temperature-equivalent control variable; and a valve opening setting unit that sets the valve openings of fuel regulating valves provided in the fuel circuits on the basis of the fuel distribution ratios, wherein the fuel distribution setting unit includes correction means for modifying the fuel distribution ratios on the basis of the turbine bypass flow rate of the compressed air.

(11) A gas turbine combustion control device according to a eleventh aspect of the present invention is the gas turbine combustion control device according to (10), wherein the fuel distribution setting unit includes: a turbine inlet temperature-equivalent control variable setting section that calculates first interpolated data equivalent to the turbine inlet temperature or the turbine inlet temperature-equivalent control variable in a first operation mode that is a normal operation mode of the gas turbine, and third interpolated data equivalent to the turbine inlet temperature or the turbine inlet temperature-equivalent control variable in a third operation mode that is a turndown operation mode in which a predetermined turbine bypass flow rate is set and part of casing air is discharged to the turbine downstream part so as to bypass the turbine; and a fuel distribution correction section that, using the first interpolated data and the third interpolated data, modifies the fuel distribution ratios in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part.

(12) A gas turbine combustion control device according to a twelfth aspect of the present invention is the gas turbine combustion control device according to (11), wherein the fuel distribution correction section includes: a control variable interpolation section that, using the first interpolated data and the third interpolated data, calculates a modified turbine inlet temperature or a modified turbine inlet temperature-equivalent control variable in the predetermined operation mode on the basis of the specific parameter; and a fuel distribution calculation section that calculates the fuel distribution ratios for the respective fuel circuits on the basis of the modified turbine inlet temperature or the modified turbine inlet temperature-equivalent control variable.

(13) A gas turbine combustion control device according to a thirteenth aspect of the present invention is the gas turbine combustion control device according to (11) or (12), wherein the turbine inlet temperature-equivalent control variable setting section includes: means for calculating first interpolated output data related to an output during no load operation in the first operation mode and second interpolated output data related to an output during rated load operation in the first operation mode; means for calculating first interpolated data equivalent to the turbine inlet temperature-equivalent control variable in the first operation mode using the first interpolated output data and the second interpolated output data; means for calculating fifth interpolated output data related to an output during no load operation in the third operation mode and sixth interpolated output data related to an output during rated load operation in the third operation mode; and means for calculating third interpolated data equivalent to the turbine inlet temperature-equivalent control variable in the third operation mode using the fifth interpolated output data and the sixth interpolated output data.

(14) A gas turbine combustion control method according to a fourteenth aspect of the present invention is a gas turbine combustion control method for a gas turbine including: a compressor having inlet guide vanes; a combustor having a plurality of fuel nozzles; a turbine; a turbine bypass pipe through which compressed air from a casing is discharged to a turbine downstream part so as to bypass the turbine; a turbine bypass valve that is mounted on the turbine bypass pipe and regulates a turbine bypass flow rate of the compressed air; and a gas turbine combustion control device configured to set flow distribution ratios for circuits of fuel supplied to the combustor, the gas turbine combustion control method comprising the steps of: calculating first interpolated data equivalent to a turbine inlet temperature or a turbine inlet temperature-equivalent control variable in a first operation mode computed on the basis of input data on the first operation mode that is a normal operation mode of the gas turbine; calculating third interpolated data equivalent to a turbine inlet temperature or a turbine inlet temperature-equivalent control variable in a third operation mode computed on the basis of input data on the third operation mode that is a turndown operation mode in which a predetermined turbine bypass flow rate is set and part of casing air is discharged to the turbine downstream part so as to bypass the turbine; using the first interpolated data and the third interpolated data, calculating a modified turbine inlet temperature or a modified turbine inlet temperature-equivalent control variable in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part; calculating fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

(15) A gas turbine combustion control method according to a fifteenth aspect of the present invention is a gas turbine combustion control method for a gas turbine including: a compressor having inlet guide vanes; a combustor having a plurality of fuel nozzles; a turbine; a turbine bypass pipe through which compressed air from a casing is discharged to a turbine downstream part so as to bypass the turbine; a turbine bypass valve that is mounted on the turbine bypass pipe and regulates a turbine bypass flow rate of the compressed air; and a gas turbine combustion control device configured to set flow distribution ratios for circuits of fuel supplied to the combustor, the gas turbine combustion control method comprising the steps of: creating a database on the basis of input data on a first operation mode that is a normal operation mode of the gas turbine, and a database on the basis of input data on a third operation mode that is a turndown operation mode in which a predetermined turbine bypass flow rate is set and part of casing air is discharged to the turbine downstream part so as to bypass the turbine; calculating first interpolated data equivalent to a turbine inlet temperature or a turbine inlet temperature-equivalent control variable in the first operation mode on the basis of the database; calculating third interpolated data equivalent to a turbine inlet temperature or a turbine inlet temperature-equivalent control variable in the third operation mode on the basis of the database; using the first interpolated data and the third interpolated data, calculating a modified turbine inlet temperature or a modified turbine inlet temperature-equivalent control variable in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part; calculating fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

(16) A gas turbine combustion control device according to a sixteenth aspect of the present invention is the gas turbine combustion control device according to any one of (2) to (5), wherein the specific parameter is one of an intake air temperature difference, a casing pressure ratio, the amount of bleed air, and the valve opening of the air bleed valve.

(17) A gas turbine combustion control device according to a seventeenth aspect of the present invention is the gas turbine combustion control device according to (11) or (12), wherein the specific parameter is one of a casing pressure ratio, the turbine bypass flow rate, and the valve opening of the turbine bypass valve.

(18) A gas turbine combustion control method according to an eighteenth aspect of the present invention is the gas turbine combustion control method according to any one of (7) to (9), wherein the specific parameter is one of an intake air temperature difference, a casing pressure ratio, the amount of bleed air, and the valve opening of the air bleed valve.

(19) A gas turbine combustion control method according to a nineteenth aspect of the present invention is the gas turbine combustion control method according to (14) or (15), wherein the specific parameter is one of a casing pressure ratio, the turbine bypass flow rate, and the valve opening of the turbine bypass valve.

(20) A non-transitory recording medium according to a twentieth aspect of the present invention is a non-transitory recording medium that readably stores a program for executing the gas turbine combustion control method according to (14) to (19).

Advantageous Effects of Invention

According to the above-described gas turbine combustion control device and combustion control method and program therefor, even when normal operation is switched to anti-icing operation, stable combustion control of the combustors is maintained, so that an increase in $NO_x$, etc. can be avoided and generation of combustion oscillation can be suppressed. As a result, stable operation of the gas turbine is realized. Moreover, it is possible to realize stable operation while meeting emission regulation values even during turndown operation (partial load operation).

BRIEF DESCRIPTION OF DRAWINGS

FIG. 19 is a view showing the process flow of a control method according to Embodiment 5.

DESCRIPTION OF EMBODIMENTS

In the following, various embodiments of gas turbine combustion control device and combustion control method for a gas turbine intended for anti-icing operation or turndown operation will be described with reference to the drawings.

In the embodiments to be described below, five operation modes, a first operation mode, a second operation mode, a third operation mode, and a predetermined operation mode in anti-icing operation and turndown operation, are distinguished from one another according to differences in operation conditions of a gas turbine. The first operation mode refers to an operation mode of normal operation in which the gas turbine does not perform anti-icing operation or turndown operation. The second operation mode refers to a standard operation mode of anti-icing operation in which a predetermined amount of bleed air is set and part of casing air is circulated to an air intake facility. The third operation mode refers to a standard operation mode of turndown operation in which a predetermined turbine bypass flow rate is set and part of casing air is discharged to the turbine downstream part so as to bypass the turbine. The predetermined operation mode in anti-icing operation refers to an operation mode of anti-icing operation in which an amount of bleed air required for stable operation is selected on the basis of the operation status of the gas turbine and that amount of bleed air is circulated to the air intake facility, and in which optimal operation conditions for anti-icing operation are set. The predetermined operation mode in turndown operation refers to an operation mode of turndown operation in which a turbine bypass flow rate required for stable operation is selected on the basis of the operation status of the gas turbine and that part of casing air is discharged to the turbine downstream part, and in which optimal operation conditions for turndown operation are set.

Embodiment 1

Gas turbine combustion control device and combustion control method of Embodiment 1 according to the present invention will be described with reference to FIG. 1 to FIG. 9.

Figure 1:
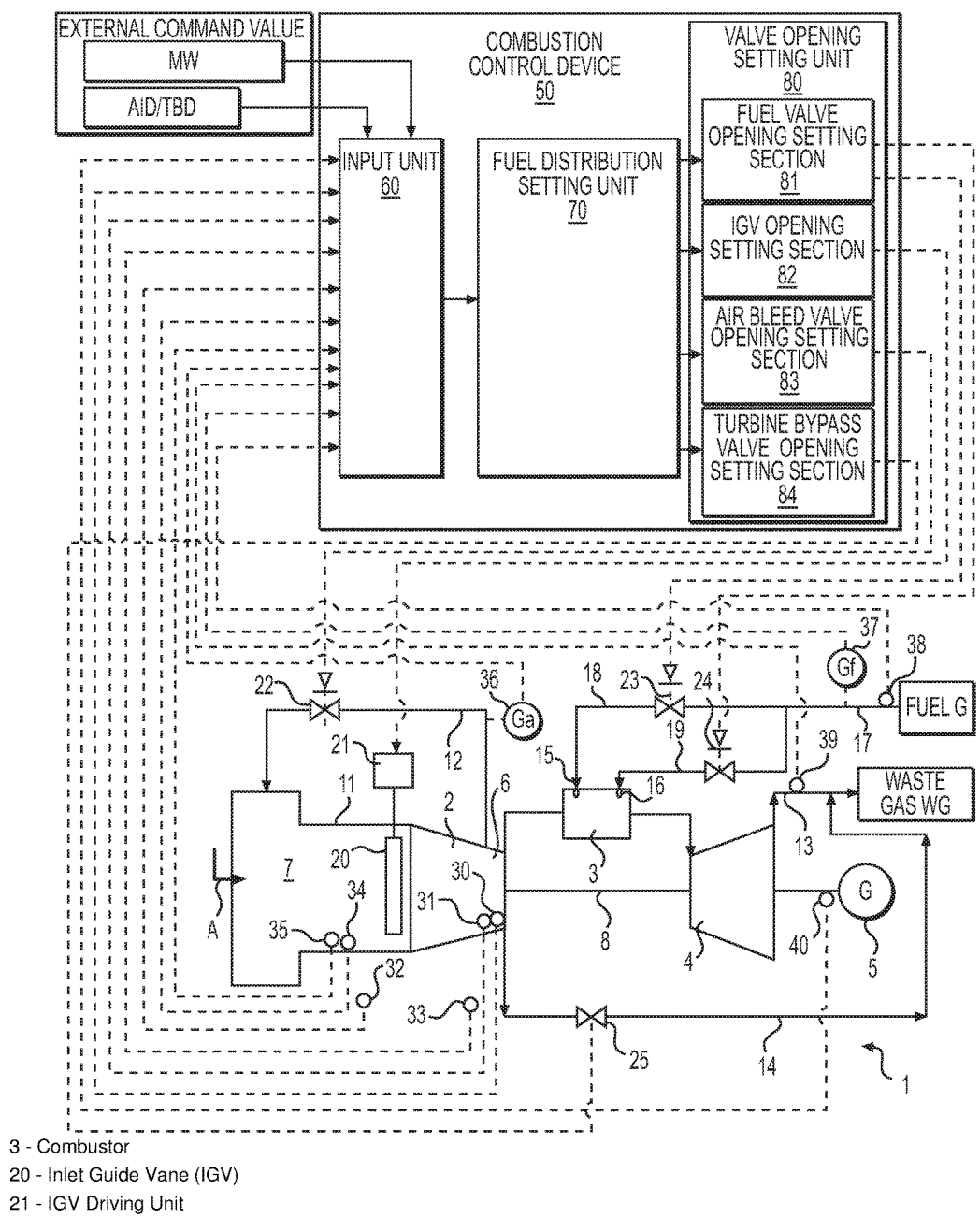
FIG. 1 is a view showing the schematic device configuration of a gas turbine in one embodiment according to the present invention.

FIG. 1 shows the device configuration of a gas turbine of Embodiment 1. A gas turbine 1 is composed mainly of a compressor 2, combustors 3, a turbine 4, and a combustion control device 50, and electric power is taken out by a generator 5 connected to a rotating shaft 8.

The compressor 2 pressurizes and compresses atmospheric air A taken in through an air intake facility 7, and temporarily stores the compressed air A in a casing 6 of the compressor 2. The combustor 3 mixes a fuel G and the compressed air A supplied from the casing 6 and combusts the mixture to produce high-temperature combustion gas. The turbine 4 has a configuration in which multiple stages of blades fixed to the rotating shaft 8 and multiple stages of vanes supported on the casing are alternately disposed. The turbine 4 introduces the combustion gas generated in the combustors 3 to rotate the rotating shaft 8, and converts the thermal energy into rotary energy to drive the generator 5. The combustion gas discharged from the turbine 4 is discharged as waste gas WG through an exhaust diffuser (not shown) from an exhaust duct 13 to the outside of the system.

The air intake facility 7 including a filter is provided on the upstream side of the compressor 2. An air intake duct 11 with a built-in intake air filter (not shown) constitutes the air intake facility 7. The air intake duct 11 is provided with an intake air temperature indicator 34, and an intake air temperature $61c$ is measured and output to the combustion control device 50.

The compressor 2 further has a bleed air pipe 12 through which part of the pressurized casing air inside the casing 6 is extracted and returned to the inlet side of the air intake facility 7. The bleed air pipe 12 has a bleed air flowmeter 36 that measures an amount of bleed air $61i$ (FIG. 8) and an air bleed valve 22. The measured amount of bleed air $61i$ is output to the combustion control device 50. The air bleed valve 22 is controlled to be turned on and off through an air bleed valve opening command value that is output from an air bleed valve opening setting section 83 of the combustion control device 50. The compressor 2 is provided with inlet guide vanes (IGVs) 20 on the inlet side. The inlet guide vanes (IGVs) 20 are variable vanes that regulate the amount of air flowing into the compressor 2 according to the gas turbine load. An IGV opening command value is output from an IGV opening setting section 82 of the combustion control device 50, and the IGVs are controlled by an IGV driving unit 21. A casing pressure indicator 31 and a casing temperature indicator 30 are provided inside the casing 6, and a casing pressure $61p$ (FIG. 7) and a casing temperature measured are output to the combustion control device 50.

The load on the gas turbine 1 is output as a load value from a generator output detection unit 40 of the generator 5 to the combustion control device 50.

The combustor 3 has a plurality of types of fuel nozzles, namely, a pilot nozzle 15 and main nozzles 16. The pilot nozzle 15 is a diffusion combustion nozzle for stabilizing combustion inside the combustor. A plurality of premixing fuel nozzles disposed around the pilot nozzle 15 are used as the main nozzles 16. To achieve $NO_x$, reduction, a top-hat nozzle (not shown) may be further provided as one of the plurality of types of fuel nozzles.

Fuel circuits that supply the fuel G to the pilot nozzle 15 and the main nozzles 16 have a first fuel circuit 18 and a second fuel circuit 19. The first fuel circuit 18 and the second fuel circuit 19 are branch pipes that are branched from a fuel main circuit 17 and connected to the respective nozzles. The first fuel circuit 18 is a pipe that is branched from the fuel main circuit 17 and supplies the fuel G to the pilot nozzle 15, and is provided with a pilot fuel regulating valve 23. The second fuel circuit 19 is a pipe that supplies the fuel G to the main nozzles 16, and is provided with a main fuel regulating valve 24. The fuel main circuit 17 is provided with a fuel flowmeter 37 and a fuel temperature indicator 38, and the measurement values are output to the combustion control device 50. The pilot fuel regulating valve 23 regulates the flow rate of pilot fuel supplied to the pilot nozzle 15 according to a valve opening command value output from a fuel valve opening setting section 81 of the combustion control device 50. Similarly, the main fuel regulating valve 24 regulates the flow rate of fuel supplied to the main nozzles 16 according to a valve opening command value output from the fuel valve opening setting section 81 of the combustion control device 50.

To discharge the compressed air A from inside the casing 6 to the turbine downstream part (exhaust diffuser or exhaust duct 13) for the purpose of, for example, adjusting the properties of the waste gas WG during partial load operation of the gas turbine, the casing 6 is provided with a turbine bypass pipe 14 that connects the casing 6 and the turbine downstream part (exhaust diffuser or exhaust duct 13) to each other so as to bypass the combustors 3 and the turbine 4. The turbine bypass pipe 14 is provided with a turbine bypass valve 25 that regulates the amount of bypassing compressed air A according to a turbine bypass valve opening command value from a turbine bypass valve opening setting section 84 of the combustion control device 50.

The temperature of the waste gas WG discharged from the gas turbine 1 is measured by a waste gas temperature indicator 39 and the measurement value is output to the combustion control device 50. An atmospheric pressure indicator 33 and an atmospheric temperature indicator 32 that measure an atmospheric pressure $61k$ and an atmospheric temperature $61g$ (FIG. 6) are disposed on the outside, and the measurement values are output to the combustion control device 50. Moreover, a gas turbine output command as well as an anti-icing command value (AID) and a turbine bypass command value (TBD) that are one of external command values to turn on or off anti-icing operation or turndown operation (to put the gas turbine into and out of anti-icing operation or turndown operation) is output from the outside to the combustion control device 50.

The combustion control device 50 is composed of an input unit 60 that receives input signals from the measurement instruments and the external command values, a fuel distribution setting unit 70 that computes a turbine inlet temperature on the basis of the input signals or the external command values and determines a required fuel flow rate, and a valve opening setting unit 80 that sets the valve openings of the valves on the basis of the command values output from the fuel distribution setting unit 70. The combustion control device 50 has a computer in its configuration. The functional components of the combustion control device 50 function through execution of a program installed in an external memory of the computer etc.

The valve opening setting unit 80 is composed of the fuel valve opening setting section 81 that sets the openings of the pilot fuel regulating valve 23 and the main fuel regulating valve 24, the IGV opening setting section 82 that sets the opening of the inlet guide vanes (IGVs) 20, the air bleed valve opening setting section 83 that sets the opening of the air bleed valve 22, and the turbine bypass valve opening setting section 84 that sets the opening of the turbine bypass valve.

The input data 61 (FIG. 2) sent from the measurement instruments or the outside to the input unit 60 include a generator output, fuel flow rate, combustion air flow rate, bleed air flow rate, intake air flow rate, turbine bypass flow rate, IGV opening, air bleed valve opening, turbine bypass valve opening, waste gas temperature, intake air temperature, atmospheric temperature, casing temperature, casing pressure, intake air pressure, atmospheric pressure, and turbine output command value (MW) and anti-icing command value (AID) as well as turbine bypass command value (TBD) as external command values. These input signals are output to the fuel distribution setting unit 70.

The fuel distribution setting unit 70 computes the combustion temperature in the combustor 3, i.e., a turbine inlet temperature (TIT), on the basis of the measurement values, such as flow rates, temperatures, and pressures at various parts, that show the operation state of the gas turbine, and the gas turbine output command value (MW) as well as the anti-icing command value (AID) or the turbine bypass command value (TBD), from the input unit 60, and sets a dimensionless (computed) turbine inlet temperature-equivalent control variable (CLCSO) on the basis of the turbine inlet temperature (TIT). The turbine inlet temperature-equivalent control variable (CLCSO) is proportional to the turbine inlet temperature (TIT). If the IGV opening is constant, the turbine inlet temperature (TIT) is proportional to the turbine output (generator output). Fuel distribution ratios FDRs of the fuel supplied to the various fuel nozzles are determined as a function of the turbine inlet temperature-equivalent control variable (CLCSO). The fuel distribution ratios FDRs for the pilot fuel regulating valve 23 and the main fuel regulating valve 24 set in the fuel distribution setting unit 70 are output to the valve opening setting unit 80.

Although not shown, the total flow rate of the fuel supplied to the various fuel nozzles is determined by a total fuel flow rate command value (CSO) that is set from the turbine output command value (MW), the generator output, etc., and the fuel distribution ratios FDRs for the pilot fuel regulating valve 23 and the main fuel regulating valve 24 are determined from the turbine inlet temperature-equivalent control variable (CLCSO).

In the fuel valve opening setting section 81, the fuel flow rates for the respective pilot fuel regulating valve 23 and main fuel regulating valve 24 are calculated on the basis of the total fuel flow rate command value (CSO) and the fuel distribution ratios FDRs for the valves, and the Cv values of the pilot fuel regulating valve 23 and the main fuel regulating valve 24 are calculated and the valve openings thereof are set. The valve opening command values are output to the fuel regulating valves to control the flow rate of the fuel supplied to each fuel nozzle. The IGV opening setting section 82 sets the IGV opening on the basis of a generator output 61a, and outputs the IGV opening to the IGV driving unit 21. The air bleed valve opening setting section 83 sets the air bleed valve opening on the basis of the anti-icing command value (AID) and outputs the air bleed valve opening to the air bleed valve 22. The turbine bypass valve opening setting section 84 sets the valve opening on the basis of the turbine bypass valve opening command value, and outputs the valve opening to the turbine bypass valve 25.

Figure 2:
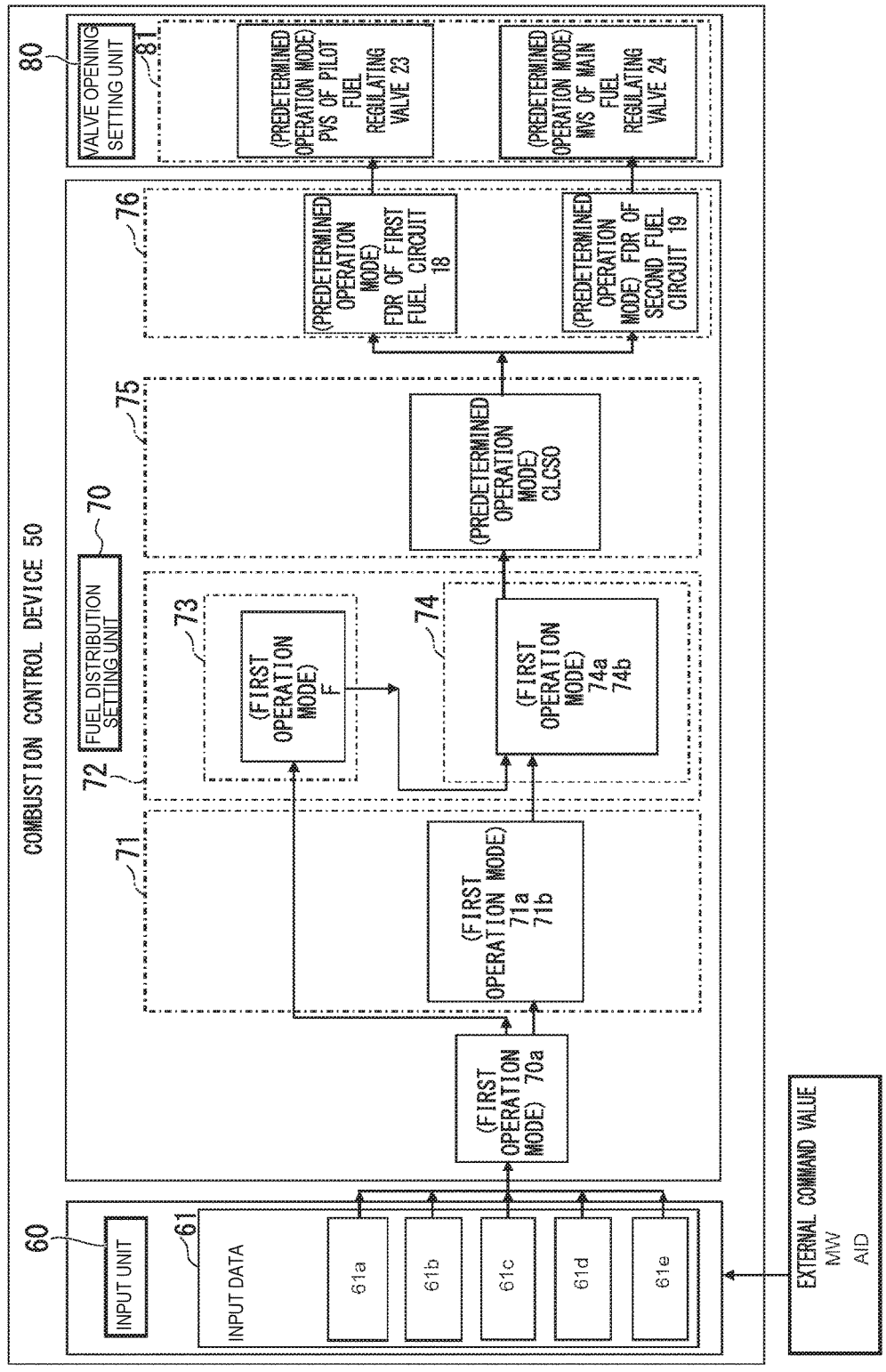
FIG. 2 is a view showing the device configuration of a combustion control device according to Embodiment 1 and data handled by the combustion control device.

Next, the configuration of the combustion control device according to this embodiment and data handled in each unit of the combustion control device will be described with reference to FIG. 2. For convenience, among the sections of the valve opening setting unit 80 of the combustion control device 50, only the fuel valve opening setting section 81 is shown in FIG. 2.

In this embodiment, a database 70a is created with reference to the first operation mode in which anti-icing operation is not performed. Specifically, control parameters are selected from the input data 61 on the various measurement values, the external command values, and the various control values that is received by the input unit 60 and shows the operation state of the gas turbine related to the first operation mode, and relations between the control parameters and the turbine output (generator output MW) are established as the database 70a on the basis of the input data 61 and a data group of separately accumulated various measurement values. In this embodiment, the turbine inlet temperature-equivalent control variable (CLCSO) is set on the basis of the database 70a. As the control parameters, the generator output 61a, an IGV opening 61b, the intake air temperature 61c, an intake air flow rate 61d, and a turbine bypass flow rate 61e are selected. The parameters presented herein as the control parameters are mere examples, to which the control parameters are not limited.

Figure 3:
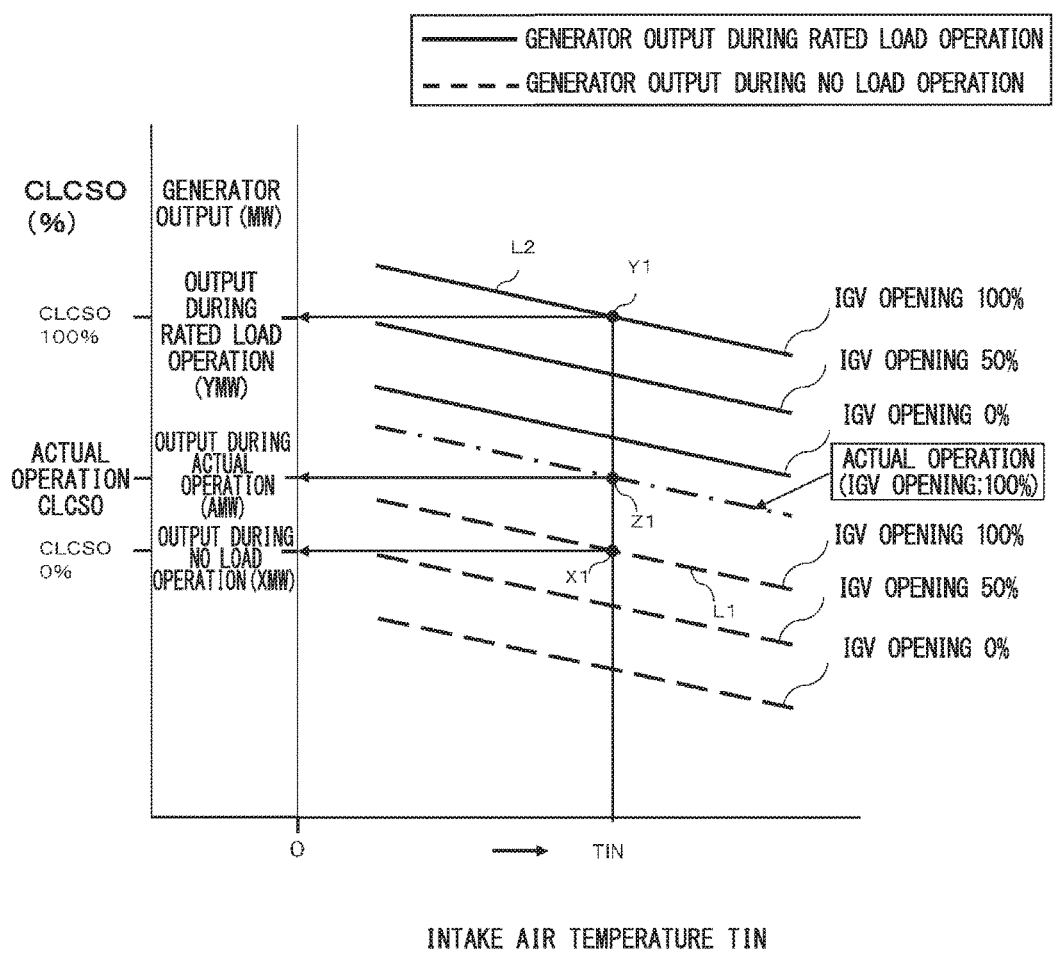
FIG. 3 is a view showing one example of a database according to Embodiment 1.

FIG. 3 shows one example of the database 70a. FIG. 3 is an example in which the generator output (MW) is represented on the vertical axis and the intake air temperature (TIN) selected from the control parameters is represented on the horizontal axis. The solid lines indicate the relation between the generator output (MW) and the intake air temperature (TIN) at the turbine inlet temperature (TIT) during rated load operation, while the dashed lines indicate the relation between the generator output (MW) and the intake air temperature (TIN) at the turbine inlet temperature (TIT) during no load operation. For the IGV opening, the opening in three stages, 0%, 50%, and 100%, are shown. According to FIG. 3, if the intake air temperature and the IGV opening are constant, the generator output (MW) and the turbine inlet temperature (TIT) are proportional to each other. Moreover, as the intake air temperature (TIN) rises, the generator output (MW) decreases. If the intake air temperature (TIN) is constant, the generator output (MW) increases with the increasing IGV opening.

Although not shown in FIG. 3, the relations between the generator output (MW) and the intake air flow rate and the turbine bypass flow rate are also included in the database 70a.

Here, the turbine inlet temperature-equivalent control variable (CLCSO) corresponding to the generator output 61a can be calculated by calculating a generator output during no load operation in the first operation mode (first interpolated output data 71a) and a generator output during rated load operation in the first operation mode (second interpolated output data 71b) from the database 70a and interpolating both pieces of data with the actual generator output 61a during actual operation. This calculation method is shown in Patent Literature 2 etc. The expression "during no load operation" refers to a case where the turbine inlet temperature is 700° C., for example, and the expression "during rated load operation" refers to a case where the turbine inlet temperature is 1500° C., for example.

With the case of the intake air temperature (TIN) and the IGV opening of 100% shown in FIG. 3 taken as an example, the calculation method of the turbine inlet temperature-equivalent control variable (CLCSO) will be described.

The turbine inlet temperature-equivalent control variable (CLCSO) is the generator output during actual operation shown in percent (%), on the basis of CLCSO=100% at a generator output during rated load operation YMW and CLCSO=0 (zero) % at a generator output during no load operation XMW. That is, when the generator output 61a during actual operation input into the input unit 60 is AMW, the relation between the generator output and CLCSO is expressed by the following formula (1):

$$CLCSO = (AMW - XMW)/(YMW - XMW) \times 100 \quad (1)$$

In FIG. 3, the line L1 indicates the relation between the generator output (MW) and the intake air temperature (TIN) in the case of no load operation at the IGV opening of 100%, and the line L2 indicates the relation in the case of rated load operation at the IGV opening of 100%. The point on the line L1 corresponding to the intake air temperature (TIN) is referred to as a point X1, and the generator output at the point X1 is denoted by XMW. Similarly, the point on the line L2 corresponding to the intake air temperature (TIN) is referred to as a point Y1, and the generator output at the point Y1 is denoted by YMW. The point on the line segment X1Y1 corresponding to the generator output during actual operation AMW is referred to as a point Z1.

In this case, the turbine inlet temperature-equivalent control variable (CLCSO) during actual operation is equivalent to a value of the ratio (line segment Z1X1)/(line segment Y1X1) shown in percent (%). That is, the turbine inlet temperature-equivalent control variable (CLCSO) during actual operation can be calculated as shown in the above formula (1) by interpolating the output during rated load operation YMW and the output during no load operation XMW with the output during actual operation AMW.

Specifically, in FIG. 3, CLCSO during actual operation can be calculated by varying the intake air temperature (TIN) and the IGV opening and selecting a value corresponding to the output during actual operation (AMW). The dot-and-dash line indicates, for reference, an estimated relation between the generator output (MW) and the intake air temperature (TIN) at a predetermined turbine inlet temperature during actual operation at the IGV opening of 100% on the assumption of the predetermined operation mode in anti-icing operation. While the method of calculating the turbine inlet temperature-equivalent control variable (CLCSO) at specific intake air temperature and IGV opening has been described above, the turbine inlet temperature-equivalent control variable (CLCSO) can be calculated by the same method when other intake air temperatures and IGV opening are selected. Although the turbine inlet temperatures during rated load operation and no load operation have been used, these temperatures are mere examples, to which the turbine inlet temperatures are not limited.

As shown in FIG. 2, the fuel distribution setting unit 70 in this embodiment includes an interpolated output data calculation section 71, an interpolated output data correction section 72, a control variable calculation section 75, and a fuel distribution calculation section 76.

As described above, when the gas turbine 1 is put into anti-icing operation, the bleed air, which is part of the casing air extracted, is circulated through the bleed air pipe 12 to the air intake facility 7. As a result, despite the same IGV opening, the amount of air supplied to the combustors decreases by the amount of bleed air circulated in anti-icing operation, and thus the gas turbine is actually in an operation state with the IGVs further closed. In this case, the combustion control becomes unstable as a difference occurs between the turbine inlet temperature-equivalent control variable (CLCSO) calculated from the IGV opening, the generator output, etc. and the actual turbine inlet temperature. To remedy this problem, it is necessary to modify the relation between the generator output and the control variable during normal operation that is the first operation mode, and correct the operation conditions so as to be suitable for anti-icing operation. Whether or not to start anti-icing operation is determined according to the atmospheric temperature 61g, and when the atmospheric temperature 61g becomes equal to or lower than a predetermined value, the anti-icing external command value (AID) is input from the outside into the combustion control device 50.

The interpolated output data calculation section 71 is a section that prepares for the correction of the operation conditions. The interpolated output data calculation section 71 calculates the turbine output (generator output) during no load operation of the gas turbine as the first interpolated output data 71a, and calculates the turbine output (generator output) during rated load operation of the gas turbine as the second interpolated output data 71b, and outputs both pieces of data to the interpolated output data correction section 72.

The interpolated output data correction section 72 is composed of a correction factor calculation section 73 and an interpolated output data modification section 74. A specific parameter that affects the stability of the combustion control during anti-icing operation is selected in advance. The interpolated output data correction section 72 functions to set first modified interpolated output data 74a and second modified interpolated output data 74b by modifying the first interpolated output data 71a and the second interpolated output data 71b on the basis of the selected specific parameter.

The correction factor calculation section 73 functions to select an output correction factor F for the specific parameter for the purpose of modifying the first interpolated output data 71a and the second interpolated output data 71b transmitted from the interpolated output data calculation section 71. In anti-icing operation, the stability of the combustion control depends on the amount of bleed air. Therefore, other than an intake air temperature difference 61f and a casing pressure ratio 61h that are significantly affected by the amount of bleed air, a valve opening 61m of the air bleed valve and the amount of bleed air 61i can also be selected as the specific parameter. The intake air temperature difference 61f refers to the difference between the intake air temperature 61c on the inlet side of the air intake facility 7 and the atmospheric temperature 61g. The casing pressure ratio 61h refers to the ratio of the casing pressure 61p to the atmospheric pressure 61k (casing pressure 61p/atmospheric pressure 61k).

Figure 4:
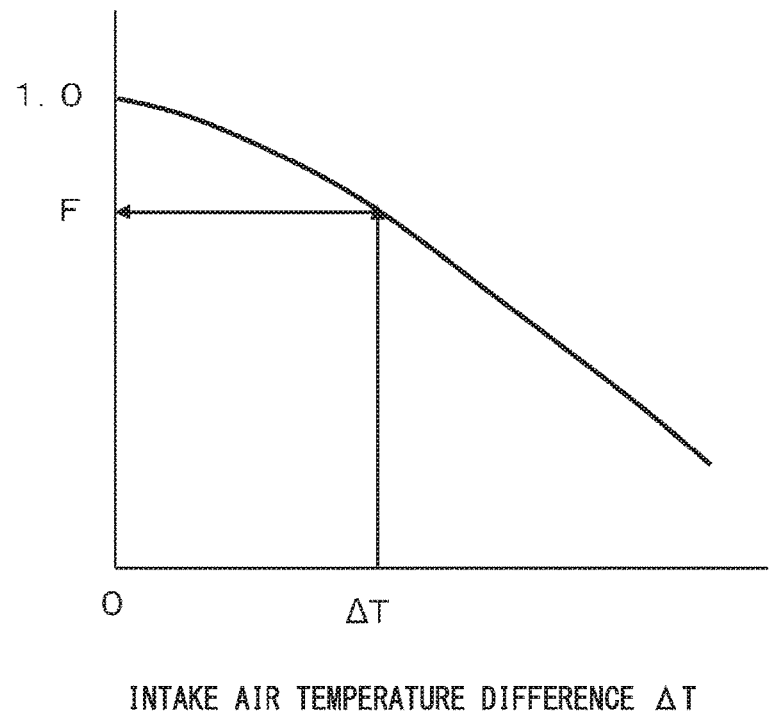
FIG. 4 is a view showing a relation between an output correction factor and an intake air temperature difference according to Embodiment 1.

In this embodiment, the intake air temperature difference 61f is taken as a typical example of the specific parameter. FIG. 4 shows a relation between the intake air temperature difference (ΔT) represented on the horizontal axis and the output correction factor F represented on the vertical axis. In the air intake facility 7, the bleed air at a comparatively high temperature is mixed with atmospheric air taken in from the outside, so that the intake air temperature difference (ΔT) increases as the amount of bleed air increases. The output correction factor F tends to decrease as the intake air temperature difference (ΔT) increases. During normal operation (first operation mode) in which no bleed air is circulated, the intake air temperature difference (ΔT) is zero and the output correction factor F is 1.0. Although not shown, the output correction factor F exhibits almost the same tendency in the case of other specific parameters (the casing pressure ratio, the valve opening of the air bleed valve, and the amount of bleed air). The calculated output correction factor F is output to the interpolated output data modification section 74.

The interpolated output data modification section 74 functions to calculate the first modified interpolated output data 74a and the second modified interpolated output data 74b by modifying the first interpolated output data 71a and the second interpolated output data 71b on the basis of the output correction factor F selected in the correction factor calculation section 73. Specifically, the first modified interpolated output data 74a is calculated by multiplying the first interpolated output data 71a by the output correction factor F. Similarly, the second modified interpolated output data 74b is calculated by multiplying the second interpolated output data 71b by the output correction factor F. The first modified interpolated output data 74a and the second modified interpolated output data 74b are output to the control variable calculation section 75.

The control variable calculation section 75 functions to calculate the turbine inlet temperature-equivalent control variable (CLCSO) using the first modified interpolated output data 74a and the second modified interpolated output data 74b that have been corrected with the intake air temperature difference 61f. Specifically, using the first modified interpolated output data 74a corresponding to the output during no load operation and the second modified interpolated output data 74b corresponding to the output during rated load operation, instead of the first interpolated output data 71a and the second interpolated output data 71b described above, the control variable calculation section 75 calculates the turbine inlet temperature-equivalent control variable (CLCSO) by the above formula (1) through interpolation with the turbine output (generator output MW) 61a during actual operation. The calculated turbine inlet temperature-equivalent control variable (CLCSO) is output to the fuel distribution calculation section 76.

Figure 5:
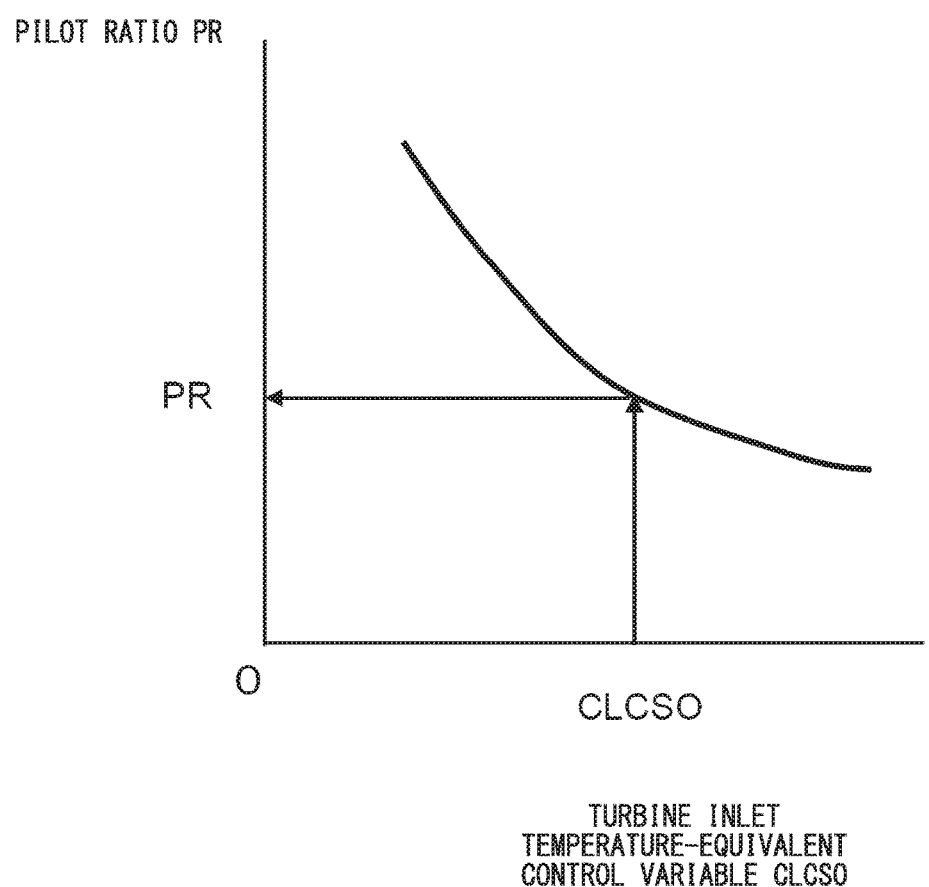
FIG. 5 is a view showing a relation between a pilot ratio and a turbine inlet temperature-equivalent control variable according to Embodiment 1.

The fuel distribution calculation section 76 functions to set the fuel distribution to the fuel nozzles on the basis of the turbine inlet temperature-equivalent control variable (CLCSO). FIG. 5 shows a relation between a pilot ratio PR and the turbine inlet temperature-equivalent control variable (CLCSO). The pilot ratio PR can be determined on the basis of the turbine inlet temperature-equivalent control variable (CLCSO) calculated in the control variable calculation section 75. Specifically, the pilot ratio PR is the fuel distribution ratio FDR, shown in percent (%), relative to the total flow rate of the fuel supplied to the first fuel circuit 18 connected to the pilot nozzle 15, and a main ratio MR is a value obtained by subtracting the pilot ratio PR from the total fuel flow rate, i.e., a ratio relative to the total fuel flow rate, shown in percent (%). That is, the main ratio MR refers to the fuel distribution ratio FDR for the second fuel circuit 19 connected to the main nozzles 16. The fuel distribution ratios FDRs for the respective first fuel circuit 18 and second fuel circuit 19 determined in the fuel distribution calculation section 76 are output to the fuel valve opening setting section 81.

The fuel valve opening setting section 81 of the valve opening setting unit 80 functions to set the valve openings of the fuel regulating valves on the basis of the fuel distribution ratios FDRs transmitted from the fuel distribution calculation section 76 and the total fuel flow rate command value (CSO) separately set in the fuel distribution setting unit 70. Specifically, for the pilot fuel regulating valve 23, the fuel valve opening setting section 81 calculates the flow rate of the fuel supplied to the pilot nozzle 15 on the basis of the total fuel flow rate command value (CSO) and the fuel distribution ratio FDR for the first fuel circuit 18, and calculates the Cv value of the pilot fuel regulating valve 23 and sets the valve opening thereof. Similarly, for the main fuel regulating valve 24, the valve opening can be set from the total fuel flow rate command value (CSO) and the fuel distribution ratio FDR for the second fuel circuit 19. A valve opening command value PVS for the pilot fuel regulating valve 23 and a valve opening command value MVS for the main fuel regulating valve 24 set in the valve opening setting unit 80 are output to the pilot fuel regulating valve 23 and the main fuel regulating valve 24, respectively. When a top-hat nozzle (not shown) is used, the valve opening of a top-hat fuel regulating valve (not shown) can be set, as with the pilot nozzle, from a relation between a top-hat ratio and the turbine inlet temperature-equivalent control variable (CLCSO).

Figure 6:
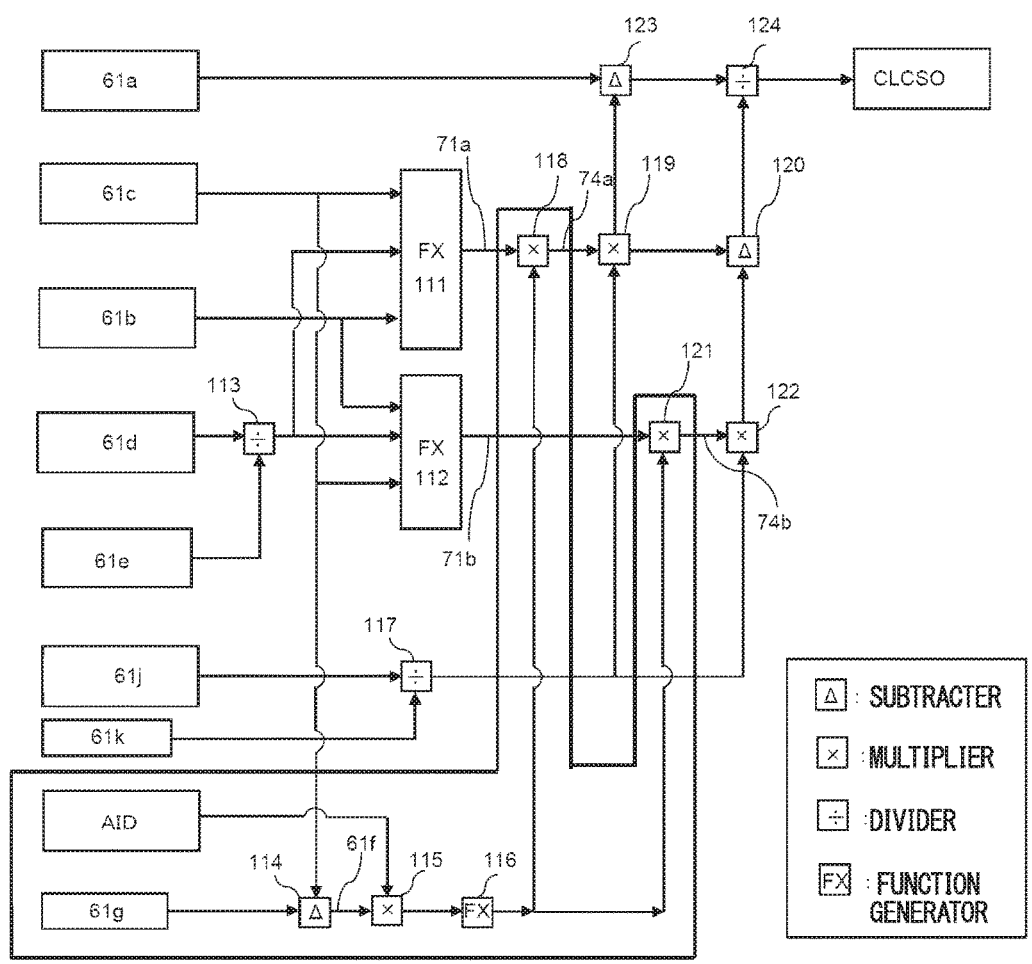
FIG. 6 is a view showing a control logic of the combustion control device according to Embodiment 1.

Next, a control logic of the combustion control device of this embodiment will be described using FIG. 6. The control logic shown in FIG. 6 is based on the control logic for calculating CLCSO shown in Patent Literature 2, with a logic for correcting the output on the basis of the output correction factor F added thereto. First, anti-icing operation of the gas turbine is started upon receipt of the anti-icing command value (AID), and correction work of the turbine inlet temperature-equivalent control variable (CLCSO) is started. This embodiment is an example in which the intake air temperature difference $61f$ is used as the specific parameter. Specifically, in the method of this embodiment, the turbine inlet temperature-equivalent control variable (CLCSO) is calculated as described above by correcting the first interpolated output data $71a$ on no load operation and the second interpolated output data $71b$ on rated load operation with the output correction factor F. The part of the control logic modified from the control logic of the conventional example of Patent Literature 2 etc. is shown in the area enclosed by the thick solid line.

In the control logic shown in FIG. 6, when the gas turbine is put into anti-icing operation, a turn-on signal of the anti-icing command value (AID) is multiplied by a multiplier 115. Meanwhile, on the basis of the intake air temperature $61c$ and the atmospheric temperature $61g$, the intake air temperature difference $61f$ is calculated by a subtractor 114 by subtracting the atmospheric temperature $61g$ from the intake air temperature $61c$. Next, the output correction factor F is calculated by a function generator 116 on the basis of the intake air temperature difference $61f$. Meanwhile, as described above, the first interpolated output data $71a$ related to the output during no load operation and the second interpolated output data $71b$ related to the output during rated load operation are generated by a first function generator 111 and a second function generator 112 on the basis of the database $70a$ that summarizes the relations between the control parameters and the generator output (MW). Next, the corrected first modified interpolated output data $74a$ is calculated by a multiplier 118 by multiplying the calculated first interpolated output data $71a$ by the output correction factor F. Similarly, the corrected second modified interpolated output data $74b$ is calculated by a multiplier 121 by multiplying the second interpolated output data $71b$ by the output correction factor F. Next, the turbine inlet temperature-equivalent control variable (CLCSO) is calculated on the basis of the first modified interpolated output data $74a$ and the second modified interpolated output data $74b$. For the specific calculation method, the turbine inlet temperature-equivalent control variable (CLCSO) can be calculated on the basis of the above formula (1), and the specific procedure is described in Patent Literature 2 etc.

Figure 7:
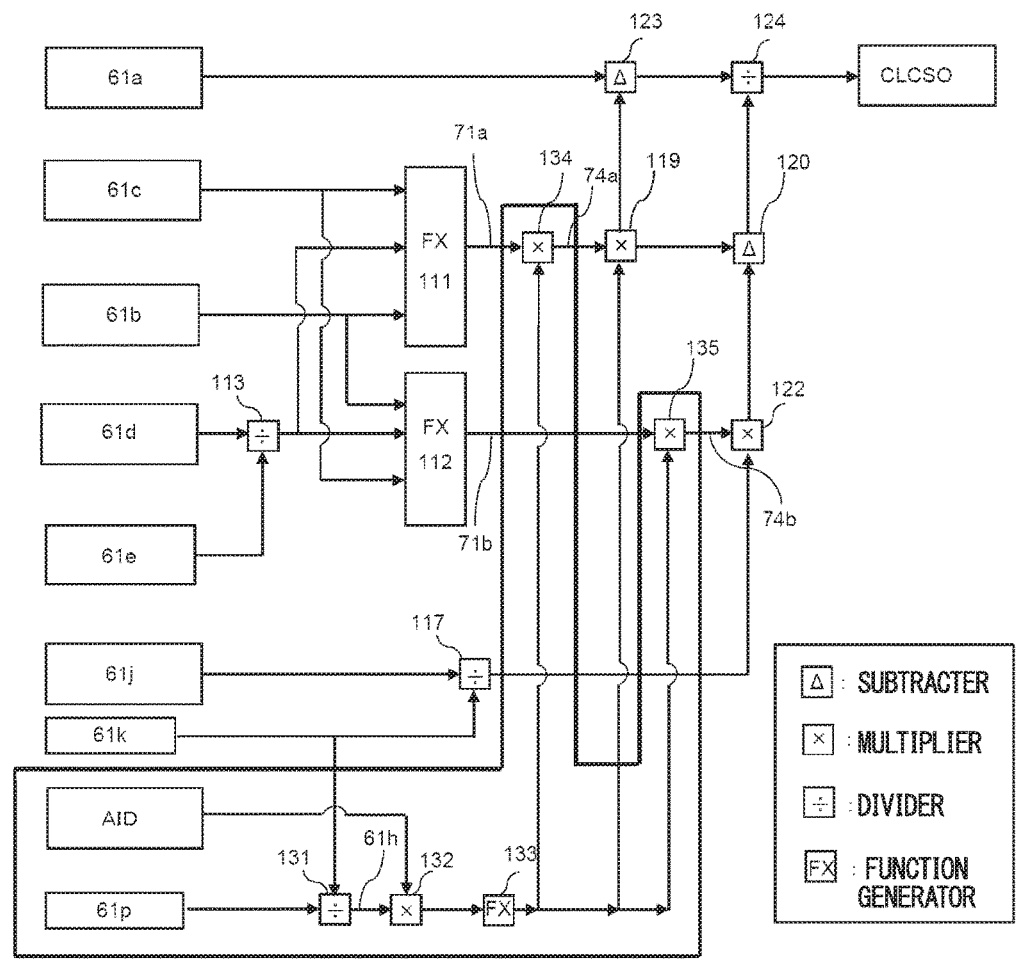
FIG. 7 is a view showing a control logic according to Modified Example 1.

FIG. 7 shows Modified Example 1 of the control logic shown in FIG. 6. Modified Example 1 is an example in which the casing pressure ratio is used as the specific parameter. Specifically, when the gas turbine is put into anti-icing operation, a turn-on signal of the anti-icing command value (AID) is multiplied by a multiplier 132. Meanwhile, the casing pressure ratio $61h$ (casing pressure $61p$/atmospheric pressure $61k$) is calculated by a divider 131 from the casing pressure $61p$ and the atmospheric pressure $61k$. Next, the output correction factor F is calculated by a function generator 133. Then, the first interpolated output data $71a$ and the second interpolated output data $71b$ are multiplied by the calculated output correction factor F by multipliers 134, 135. The subsequent method of calculating the turbine inlet temperature-equivalent control variable (CLCSO) is the same as that of Patent Literature 2 etc.

The part other than the control logic enclosed by the thick line has the same configuration as in Embodiment 1, and therefore the same names and reference signs are used and detailed description thereof is omitted.

Figure 8:
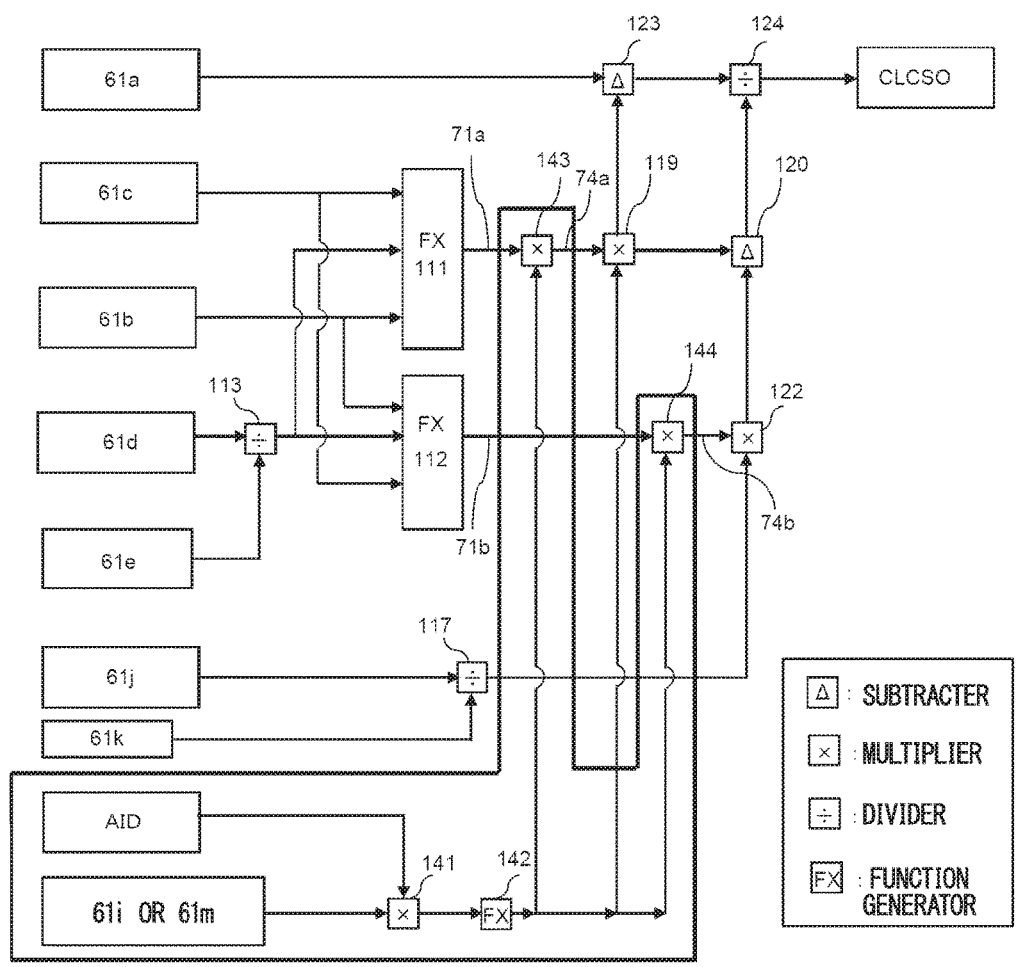
FIG. 8 is a view showing a control logic according to Modified Example 2.

FIG. 8 shows Modified Example 2 in which the amount of bleed air $61i$ or the air bleed valve opening $61m$ is selected as the specific parameter. When the gas turbine is put into anti-icing operation, a turn-on signal of the anti-icing command value (AID) is multiplied by a multiplier 141. Meanwhile, the output correction factor F is calculated by a function generator 142 from the amount of bleed air $61i$ or the air bleed valve opening $61m$. The first interpolated output data $71a$ and the second interpolated output data $71b$ are each multiplied by the calculated output correction factor F by multipliers 143, 144. The subsequent method of calculating the turbine inlet temperature-equivalent control variable (CLCSO) is the same as the method described in Patent Literature 2 etc. The part other than the control logic enclosed by the thick line has the same configuration as in Embodiment 1, and therefore the same names and reference signs are used and detailed description thereof is omitted.

Figure 9:
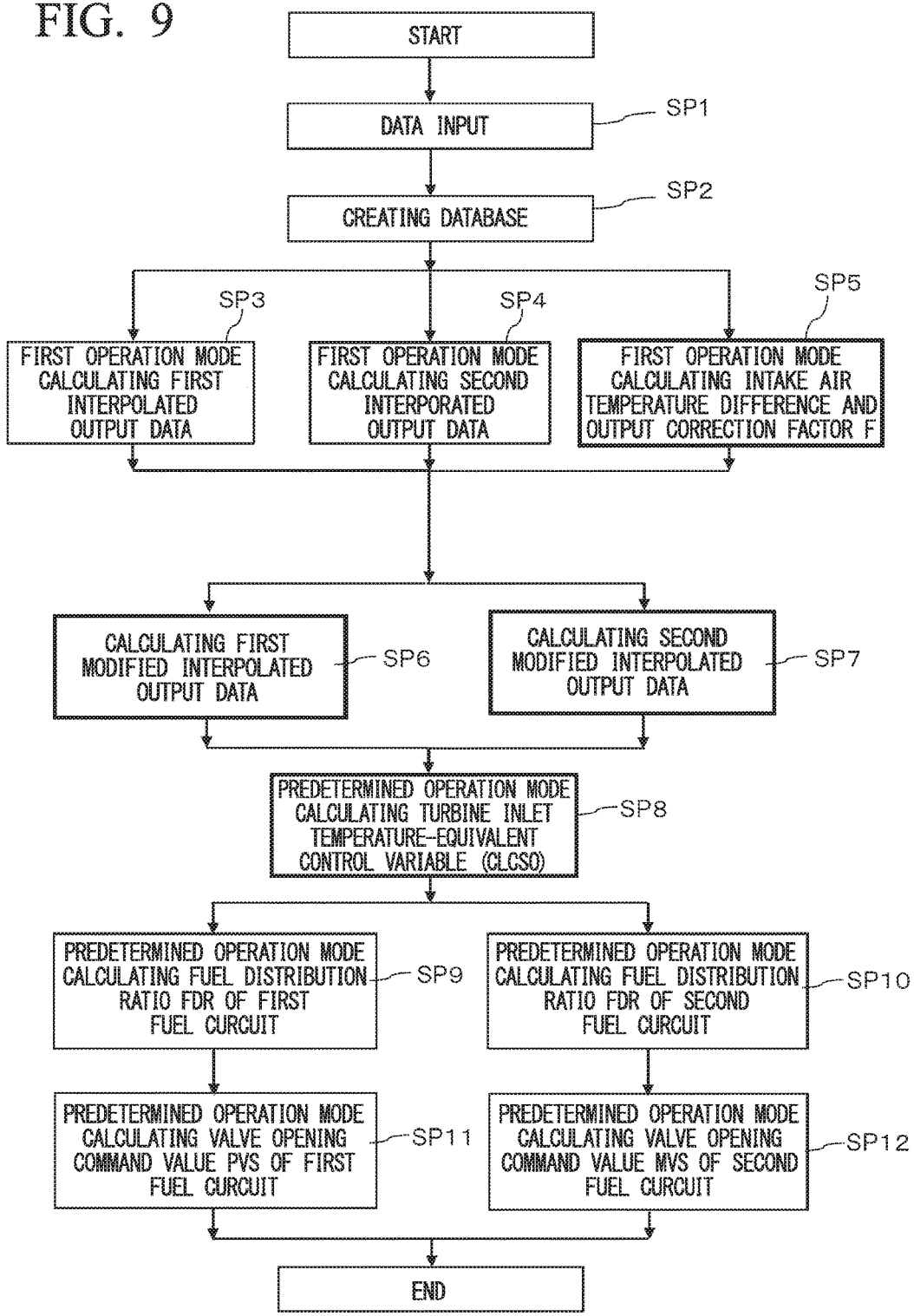
FIG. 9 is a view showing the process flow of a control method according to Embodiment 1.

Next, regarding the combustion control method that is applied when anti-icing operation of the gas turbine is started, the process flow of the control method according to Embodiment 1 will be described on the basis of FIG. 9. The basic concept of the process flow of the control method according to Embodiment 1 is based on the method described in Patent Literature 2 that shows the process flow related to a combustion control method during normal operation (first operation mode). Processing tasks that are different from those of the method described in Patent Literature 2 are indicated as thick-lined blocks in FIG. 9.

The measurement values, the various valve openings, and the external command values are transmitted to the input unit 60, and output as the input data 61 to the fuel distribution setting unit 70 (SP1).

Next, as a preparatory processing task, the database $70a$ is created of the relations between the control parameters and the turbine output (generator output MW) in the fuel distribution setting unit 70 on the basis of the input data 61 received by the input unit 60 (SP2).

On the basis of the created database 70a, the first interpolated output data 71a on no load operation and the second interpolated output data 71b on rated load operation are calculated in the interpolated output data calculation section 71 (SP3, SP4).

In the correction factor calculation section 73, the intake air temperature difference 61f is calculated on the basis of the intake air temperature 61c and the atmospheric temperature 61g transmitted from the input unit 60, and the output correction factor F is calculated on the basis of the calculated intake air temperature difference 61f(SP5).

When the specific parameter is the casing pressure ratio 61h as described above, the casing pressure ratio 61h is calculated from the casing pressure 61p and the atmospheric pressure 61k, instead of the intake air temperature 61c and the atmospheric temperature 61g, and the output correction factor F is calculated. When the specific parameter is the amount of bleed air 61i or the air bleed valve opening 61m, the output correction factor F is calculated from the amount of bleed air 61i or the air bleed valve opening 61m.

In the interpolated output data modification section 74, the first modified interpolated output data 74a and the second modified interpolated output data 74b are calculated by multiplying the first interpolated output data 71a and the second interpolated output data 71b calculated in the interpolated output data calculation section 71 by the output correction factor F calculated in the correction factor calculation section 73 (SP6, SP7).

In the control variable calculation section 75, using the turbine output (generator output) 61a in the predetermined operation (actual operation) mode, the turbine inlet temperature-equivalent control variable (CLCSO) in the predetermined operation mode is determined on the basis of the first modified interpolated output data 74a and the second modified interpolated output data 74b output from the interpolated output data modification section 74 (SP8).

Next, in the fuel distribution calculation section 76, the fuel distribution ratios FDRs related to the first fuel circuit 18 and the second fuel circuit 19 in the predetermined operation (actual operation) mode are calculated using the relation between the pilot ratio PR and the turbine inlet temperature-equivalent control variable (CLCSO) shown in FIG. 5. Specifically, the pilot ratio PR, i.e., the fuel distribution ratio FDR for the first fuel circuit 18, is calculated from the relation shown in FIG. 5 using the turbine inlet temperature-equivalent control variable (CLCSO) calculated on the basis of the modified interpolated output data (first modified interpolated output data 74a and second modified interpolated output data 74b) obtained by correcting the interpolated output data on normal operation (first interpolated output data 71a and second interpolated output data 71b) (SP9). The fuel distribution ratio FDR for the second fuel circuit 19 can be calculated by subtracting the fuel distribution ratio FDR for the first fuel circuit 18 from the total fuel flow rate being 1 (100%) (SP10).

Next, in the fuel valve opening setting section 81 of the valve opening setting unit 80, the valve openings of the pilot fuel regulating valve 23 and the main fuel regulating valve 24 are set on the basis of the fuel distribution ratios FDRs for the respective first fuel circuit 18 and second fuel circuit 19 calculated in the fuel distribution calculation section 76. The valve opening command values PVS, MVS are output to the pilot fuel regulating valve 23 and the main fuel regulating valve 24 (SP11, SP12).

According to Embodiment 1, even when the gas turbine is switched from normal operation to anti-icing operation, the generator output is maintained and the turbine inlet temperature-equivalent control variable (CLCSO) is properly corrected relative to an increase in amount of bleed air, so that stable combustion control can be maintained.

Moreover, according to this embodiment, it is possible to realize stable operation of the gas turbine while meeting emission regulation values of $NO_x$, CO, etc. even during turndown operation.

Embodiment 2

Next, Embodiment 2 will be described with reference to FIG. 10 to FIG. 12.

This embodiment is different from Embodiment 1 in that a first database 90a related to the first operation mode and a second database 90b related to the second operation mode are prepared, and that a modified turbine inlet temperature-equivalent control variable (MCLCSO) in the predetermined operation (actual operation) mode in anti-icing operation is calculated from these databases.

In other words, the two embodiments are different in that the database 70a with reference only to the first operation mode is used in Embodiment 1 while the databases 90a, 90b with reference to both the first operation mode and the second operation mode are used in Embodiment 2.

Figure 10:
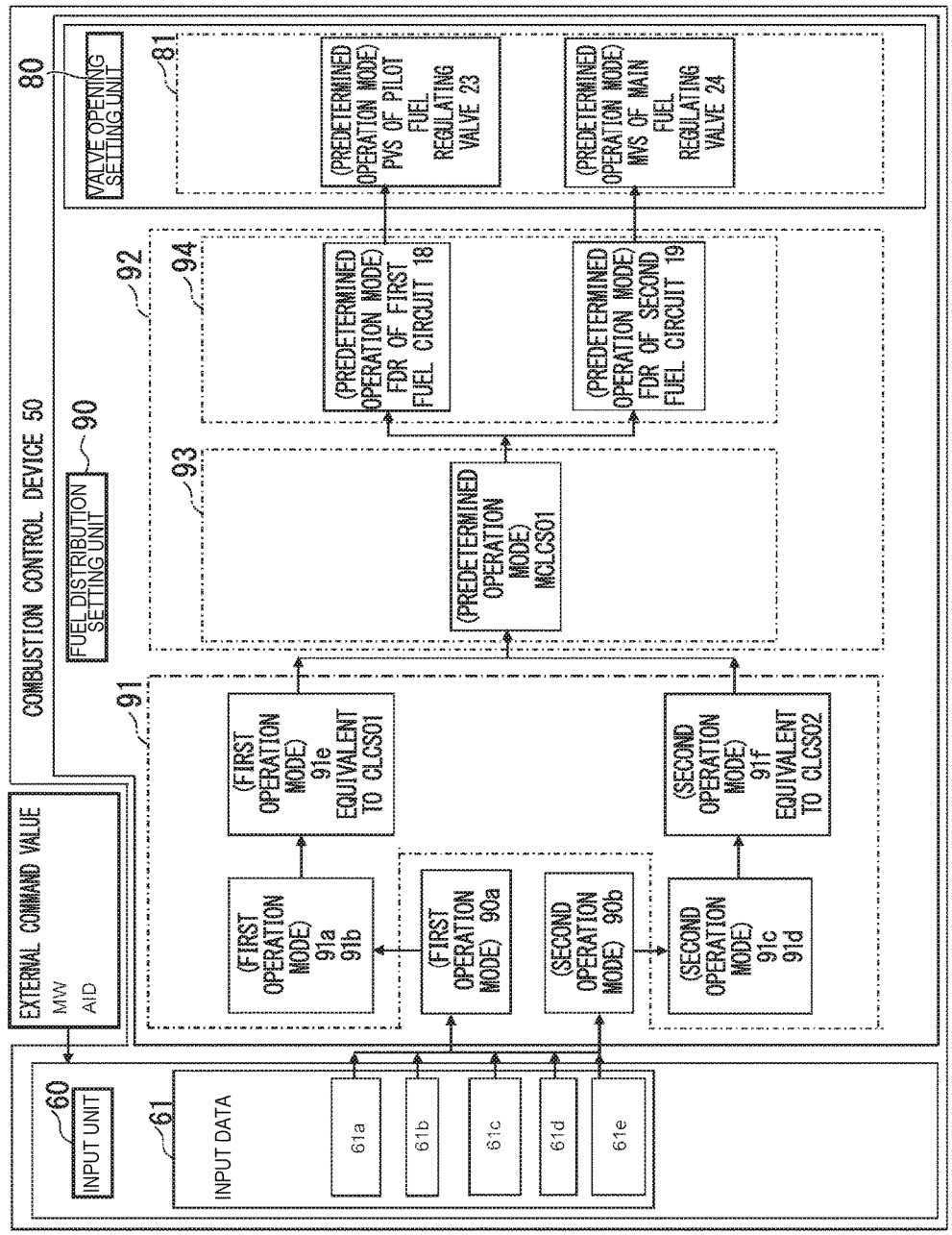
FIG. 10 is a view showing the device configuration of a combustion control device according to Embodiment 2 and data handled by the combustion control device.

In FIG. 10, as preparation, the first database 90a related to the first operation mode and the second database 90b related to the second operation mode are created of the relations between the control parameters and the turbine output (generator output MW) in a fuel distribution setting unit 90 on the basis of the input data 61 on the measurement values and the external command values (output command value (MW) and anti-icing command value (AID)) output from the input unit 60. The configuration of each database in this embodiment is the same as in Embodiment 1.

Although the combustion control device 50 of this embodiment is composed of the input unit 60, the fuel distribution setting unit 90, and the valve opening setting unit 80 as in Embodiment 1, the configuration of the fuel distribution setting unit 90 of Embodiment 2 is different from that of Embodiment 1. Specifically, the fuel distribution setting unit 90 includes a turbine inlet temperature-equivalent control variable setting section 91 and a fuel distribution correction section 92.

The turbine inlet temperature-equivalent control variable setting section 91 functions to calculate the turbine inlet temperature-equivalent control variable (CLCSO) related to the first operation mode and the second operation mode. That is, the turbine inlet temperature-equivalent control variable setting section 91 calculates first interpolated output data 91a on no load operation and second interpolated output data 91b on rated load operation from the first database 90a related to the first operation mode. Similarly, the turbine inlet temperature-equivalent control variable setting section 91 calculates third interpolated output data 91c on no load operation and fourth interpolated output data 91d on rated load operation from the second database 90b related to the second operation mode.

Next, first interpolated data 91e equivalent to a turbine inlet temperature-equivalent control variable (CLCSO1) in the first operation mode is calculated from the first interpolated output data 91a and the second interpolated output data 91b related to the first operation mode. Second interpolated data 91f equivalent to a turbine inlet temperature-equivalent control variable (CLCSO2) in the second operation mode is calculated from the third interpolated output data 91c and the fourth interpolated output data 91d related to the second operation mode. The procedure of calculating the first interpolated data 91e and the second interpolated data 91f from the databases 90a, 90b on the respective first operation mode and second operation mode is the same as the procedure described in Embodiment 1. The calculated first interpolated data 91e and second interpolated data 91f are output to a control variable interpolation section 93 of the fuel distribution correction section 92.

The fuel distribution correction section 92 includes the control variable correction section 93 that calculates the modified turbine inlet temperature-equivalent control variable (MCLCSO) by correcting the turbine inlet temperature-equivalent control variables (CLCSO1, CLCSO2) calculated in the turbine inlet temperature-equivalent control variable setting section 91, and a fuel distribution calculation section 94 that sets the fuel distribution ratios FDRs for the fuel circuits 18, 19 from the modified turbine inlet temperature-equivalent control variable (MCLCSO).

Specifically, the control variable interpolation section 93 functions to calculate the modified turbine inlet temperature-equivalent control variable (MCLCSO) in the predetermined operation (actual operation) mode on the basis of the first interpolated data 91e equivalent to the turbine inlet temperature-equivalent control variable (CLCSO1) related to the first operation mode and the second interpolated data 91f equivalent to the turbine inlet temperature-equivalent control variable (CLCSO2) related to the second operation mode, both transmitted from the turbine inlet temperature-equivalent control variable setting section 91.

The concept of calculating the modified turbine inlet temperature-equivalent control variable (MCLCSO) will be specifically described with reference to FIG. 11. FIG. 11 shows a relation between the turbine inlet temperature-equivalent control variable (CLCSO) and the casing pressure ratio (CPR) in the operation modes in the case where the casing pressure ratio is selected as the specific parameter. The turbine inlet temperature-equivalent control variable (CLCSO) is represented on the vertical axis, and the casing pressure ratio (CPR) is represented on the horizontal axis. While the casing pressure ratio (CPR) is described here as an example of the specific parameter, the same concept is applicable to other specific parameters as well.

The turbine inlet temperature (TIT) is proportional to the turbine output (generator output MW). If the IGV opening is constant, the turbine inlet temperature (TIT) is also proportional to the casing pressure ratio (CPR). The turbine inlet temperature-equivalent control variable (CLCSO) is a dimensionless value of the turbine inlet temperature (TIT) as described above. Accordingly, if the IGV opening is constant, the turbine inlet temperature-equivalent control variable (CLCSO) is proportional to the casing pressure ratio (CPR) and the turbine output (generator output MW). Thus, as shown in FIG. 11, if the IGV opening is constant, the relation between the turbine inlet temperature-equivalent control variable (CLCSO) and the casing pressure ratio (CPR) is represented by a linear relation.

Figure 11:
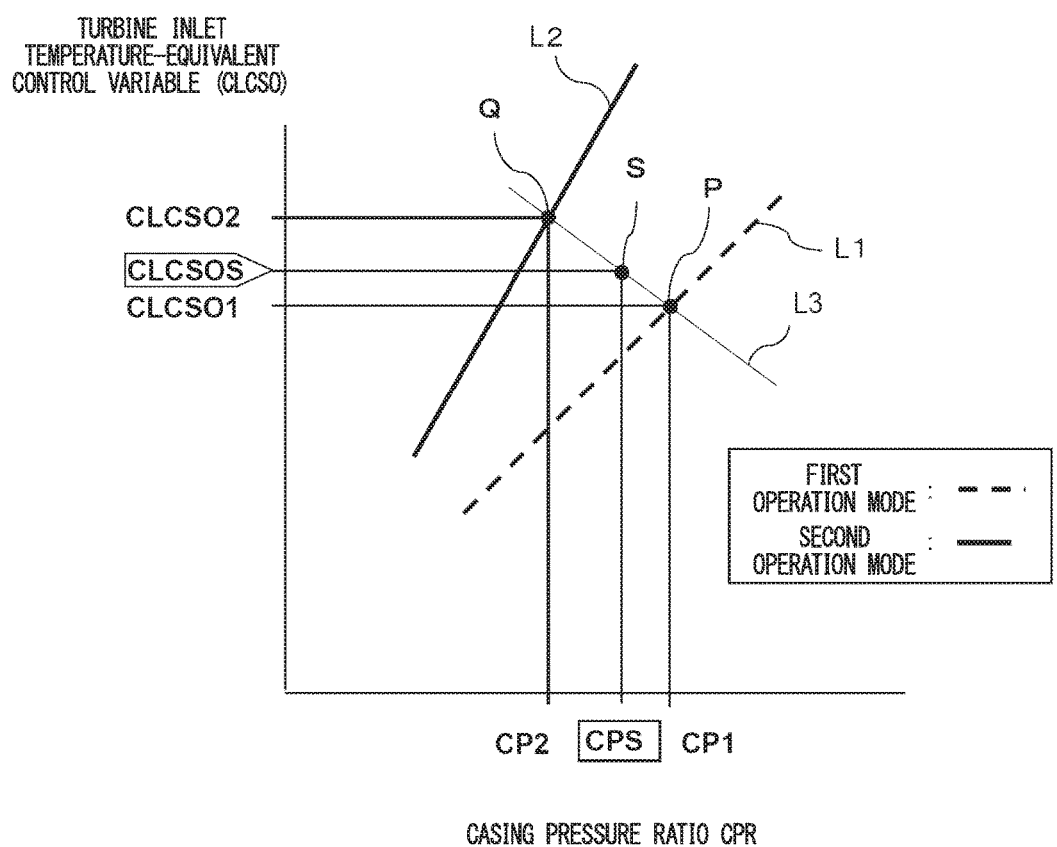
FIG. 11 is a view showing a relation between a turbine inlet temperature-equivalent control variable (CLCSO) and a casing pressure ratio in operation modes according to Embodiment 2.
Figure 12:
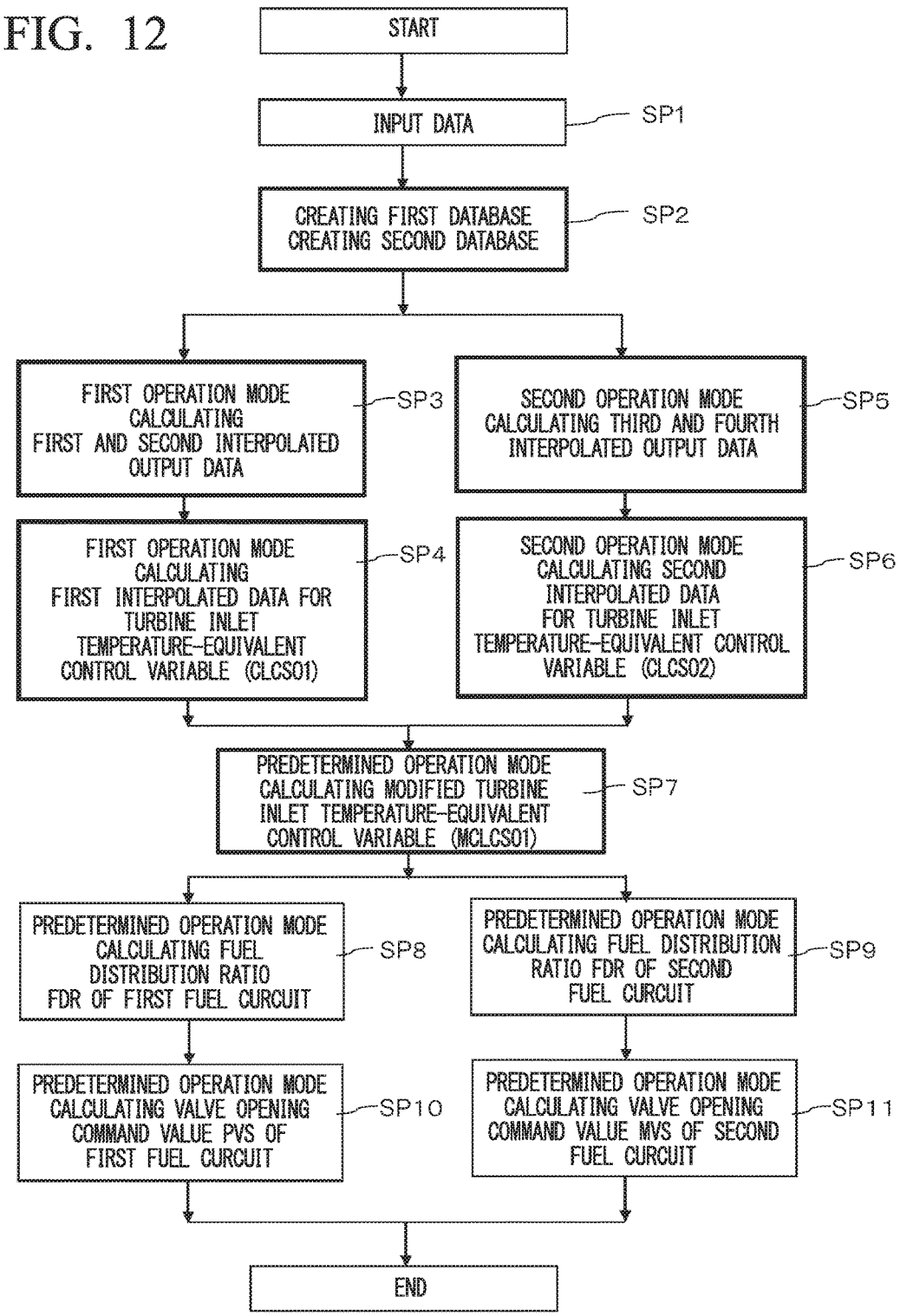
FIG. 12 is a view showing the process flow of a control method according to Embodiment 2.

In FIG. 11, the first operation mode is indicated by the dashed line as the line L1, while the second operation mode is indicated by the solid line as the line L2. In anti-icing operation, part of the casing air is extracted and circulated to the air intake facility 7, so that the casing pressure decreases and the fuel-air ratio inside the combustors increases. Therefore, when anti-icing operation is started, the turbine inlet temperature-equivalent control variable (CLCSO) becomes higher than that in normal operation (first operation mode) in which anti-icing operation is not performed. That is, if the casing pressure ratio is the same, the turbine inlet temperature-equivalent control variable (CLCSO) is higher in the second operation mode than in the first operation mode.

In FIG. 11, the casing pressure ratio in the first operation mode and the casing pressure ratio in the second operation mode are denoted by CP1, CP2, respectively, and the turbine inlet temperature-equivalent control variables (CLCSOs) in the first and second operation modes are denoted by CLCSO1, CLCSO2, respectively. When the point on the line L1 corresponding to the casing pressure ratio in the first operation mode (CP1) is referred to as a point P and the point on the line L2 corresponding to the casing pressure ratio in the second operation mode (CP2) is referred to as a point Q, the turbine inlet temperature-equivalent control variables corresponding to the points P, Q are equivalent to CLCSO1, CLCSO2.

Next, the casing pressure ratio in the predetermined operation (actual operation) mode is denoted by CPS, and the point on the line L3, which connects the points P, Q on the lines L1, L2, corresponding to the casing pressure ratio CPS is referred to as a point S. When the turbine inlet temperature-equivalent control variable corresponding to the point S is denoted by CLCSOS, this value is equivalent to the modified turbine inlet temperature-equivalent control variable (MCLCSO) in the predetermined operation (actual operation) mode. Thus, the relation among the turbine inlet temperature-equivalent control variables CLCSO1, CLCSO2, CLCSOS and the casing pressure ratios CP1, CP2, CPS is expressed by the following formula (2):

$$CLCSOS=CLCSO1+(CLCSO2-CLCSO1)\times(CPS-CP1)/(CP2-CP1) \qquad (2)$$

Accordingly, it is possible to calculate the turbine inlet temperature-equivalent control variable (CLCSOS) in the predetermined operation (actual operation) mode, from the casing pressure ratio in the first operation mode (CP1), the casing pressure ratio in the second operation mode (CP2), and the casing pressure ratio in the predetermined operation (actual operation) mode (CPS), by linearly interpolating the turbine inlet temperature-equivalent control variables in the first operation mode and the second operation mode (CLCSO1, CLCSO2). This turbine inlet temperature-equivalent control variable (CLCSOS) is equivalent to the modified turbine inlet temperature-equivalent control variable (MCLCSO) in the predetermined operation (actual operation) mode. While the interpolation method has been described above, the present invention is not limited thereto; for example, even when the casing pressure ratio (CPS) is smaller than the casing pressure ratio (CP2), the modified turbine inlet temperature-equivalent control variable (MCLCSO) in the predetermined operation mode can be similarly calculated by using a liner extrapolation method.

Next, in the fuel distribution calculation section 94, the fuel distribution ratios FDRs related to the first fuel circuit 18 and the second fuel circuit 19 in the predetermined operation mode are calculated using the modified turbine inlet temperature-equivalent control variable (MCLCSO) calculated in the control variable interpolation section 93. The calculation procedure of the fuel distribution ratios FDRs is the same as the method of Embodiment 1 described with reference to FIG. 5, and therefore the details thereof will be omitted. The calculated fuel distribution ratios FDRs for the first fuel circuit 18 and the second fuel circuit 19 are output to the fuel valve opening setting section 81 of the valve opening setting unit 80.

In the fuel valve opening setting section 81, the valve openings of the pilot fuel regulating valve 23 of the first fuel circuit 18 and the main fuel regulating valve 24 of the second fuel circuit 19 are set. As the setting procedure of the valve openings of the valves is the same as in Embodiment 1, the details thereof will be omitted. The determined valve openings are output to the pilot fuel regulating valve 23 and the main fuel regulating valve 24. When the top-hat fuel regulating valve (not shown) is used, the valve opening can be set by the same procedure as with the pilot fuel regulating valve.

Next, the process flow of a control method according to Embodiment 2 will be described on the basis of FIG. 12. The process flow that is different from the method of Embodiment 1 shown in FIG. 9 is indicated as thick-lined blocks in FIG. 12.

As in Embodiment 1, the measurement values, the various valve openings, and the external command values are transmitted to the input unit 60, and output as the input data 61 to the fuel distribution setting unit 90 (SP1).

Next, as a preparatory processing task, the database 90a and the database 90b are created of the relations between the control parameters and the turbine output (generator output MW) in the fuel distribution setting unit 90 (SP2). The databases 90a, 90b related to the first operation mode and the second operation mode will be referred to as the first database 90a and the second database 90b, respectively. In this embodiment, the casing pressure ratio (CPR) is shown as a typical example of the specific parameter to be selected, but other specific parameters can also be used as in Embodiment 1.

Next, the first interpolated output data 91a on no load operation and the second interpolated output data 91b on rated load operation are calculated using the first database 90a on the first operation mode (SP3). Then, the first interpolated data 91e equivalent to the turbine inlet temperature-equivalent control variable (CLCSO1) in the first operation mode is calculated on the basis of the first interpolated output data 91a and the second interpolated output data 91b (SP4). The procedure of calculating the turbine inlet temperature-equivalent control variable (CLCSO) from the database is the same as the procedure described in Embodiment 1.

Next, the third interpolated output data 91c on no load operation and the fourth interpolated output data 91d on rated load operation are calculated using the second database 90b on the second operation mode (SP5). Then, the second interpolated data 91f equivalent to the turbine inlet temperature-equivalent control variable (CLCSO2) in the second operation mode is calculated on the basis of the third interpolated output data 91c and the fourth interpolated output data 91d (SP6).

Next, the modified turbine inlet temperature-equivalent control variable (MCLCSO) in the predetermined operation (actual operation) mode is calculated on the basis of the first interpolated data 91e on the first operation mode and the second interpolated data 91f on the second operation mode (SP7). The procedure of calculating the modified turbine inlet temperature-equivalent control variable (MCLCSO) in the predetermined operation (actual operation) mode by interpolating the turbine inlet temperature-equivalent control variable (CLCSO1) and the casing pressure ratio (CP1) in the first operation mode and the turbine inlet temperature-equivalent control variable (CLCSO2) and the casing pressure ratio (CP2) in the second operation mode is the same as the procedure described using FIG. 11.

Next, the fuel distribution ratios FDRs for the first fuel circuit 18 and the second fuel circuit 19 are calculated on the basis of the modified turbine inlet temperature-equivalent control variable (MCLCSO) in the predetermined operation (actual operation) mode (SP8, SP9). The valve openings PVS, MVS of the pilot fuel regulating valve 23 of the first fuel circuit 18 and the main fuel regulating valve 24 of the second fuel circuit 19 can be selected on the basis of the calculated fuel distribution ratios FDRs for the first fuel circuit 18 and the second fuel circuit 19 (SP10, SP11).

According to the aspect of this embodiment, compared with Embodiment 1, the turbine inlet temperature-equivalent control variable (CLCSO) is calculated by interpolating the database on anti-icing operation and the database on normal operation, so that the turbine inlet temperature-equivalent control variable (CLCSO) can be set more accurately than in Embodiment 1. Thus, even when anti-icing operation is started, more stable combustion control can be realized.

Moreover, according to this embodiment, as in Embodiment 1, it is possible to realize stable operation of the gas turbine while meeting emission regulation values of $NO_x$, CO, etc. even during turndown operation.

Embodiment 3

Next, Embodiment 3 will be described with reference to FIG. 13.

In both Embodiment 1 and Embodiment 2, the relations between the turbine output (generator output MW) or the turbine inlet temperature and the control parameters are made into a database on the basis of the input data (input data group) 61 transmitted from the input unit 60, and the fuel distribution ratios for the fuel circuits and the valve openings are set on the basis of the database. Embodiment 3 is different from Embodiment 1 and Embodiment 2 in that the relations between the turbine inlet temperature (TIT) and the input data 61 are made into a database without using any control parameter, and the valve openings of the valves are set on the basis of the database.

While the configuration of the database in this embodiment is different from that of the other embodiments, the basic concept of the modification method, in which a database related to the first operation mode and a database related to the second operation mode are prepared and a modified turbine inlet temperature or a modified turbine inlet temperature-equivalent control variable in the predetermined operation mode in anti-icing operation is calculated from the databases, is the same as that of Embodiment 2. Here, the turbine inlet temperature (TIT), other than the turbine inlet temperature-equivalent control variable (CLCSO), is included in the objects to be calculated from the databases, because the turbine inlet temperature (TIT) and the turbine inlet temperature-equivalent control variable (CLCSO) are proportional to each other as described above, and therefore the turbine inlet temperature-equivalent control variable (CLCSO) can be substituted by the turbine inlet temperature (TIT).

Figure 13:
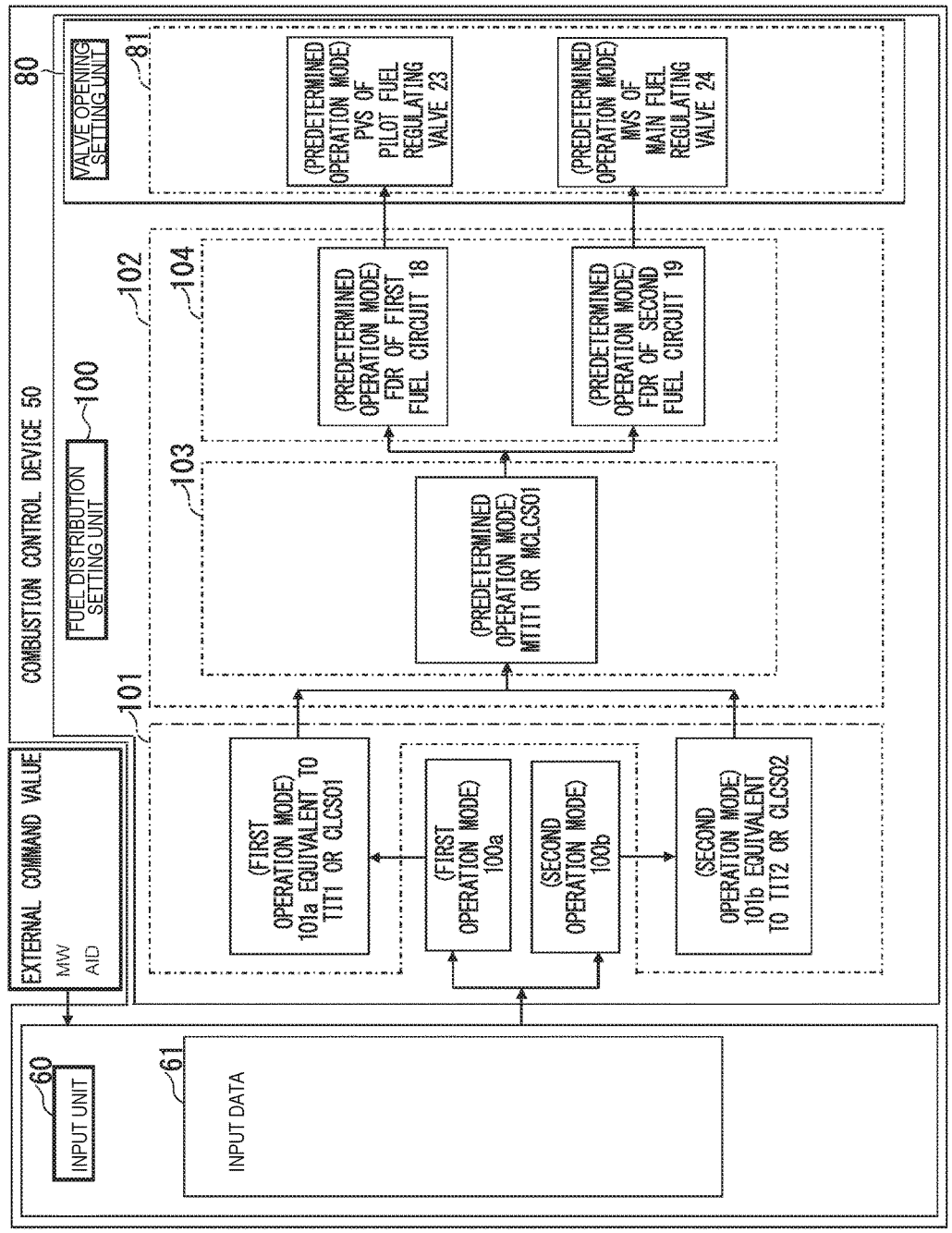
FIG. 13 is a view showing the device configuration of a combustion control device according to Embodiment 3 and data handled by the combustion control device.

In FIG. 13, as preparation, a first general database 100a related to the first operation mode and a second general database 100b related to the second operation mode are created of the relations between the turbine inlet temperature (TIT) and the input data 61 in a fuel distribution setting unit 100 on the basis of the input data 61 related to the measurement values, the control values, and the external command values output from the input unit 60.

A turbine inlet temperature-equivalent control variable setting section 101 functions to set interpolated data 101a, 101b equivalent to the turbine inlet temperature (TIT) or the turbine inlet temperature-equivalent control variable (CLCSO) in the first operation mode and the second operation mode. Specifically, the turbine inlet temperature-equivalent control variable setting section 101 calculates the first interpolated data 101a equivalent to a turbine inlet temperature (TIT1) or the turbine inlet temperature-equivalent control variable (CLCSO1) in the first operation mode on the basis of the first general database 100a related to the first operation mode. Moreover, the turbine inlet temperature-equivalent control variable setting section 101 calculates the second interpolated data 101b equivalent to a turbine inlet temperature (TIT2) or the turbine inlet temperature-equivalent control variable (CLCSO2) in the second operation mode on the basis of the second general database 100b related to the second operation mode. Both pieces of data are output to a control variable interpolation section 103 of a fuel distribution correction section 102.

The control variable interpolation section 103 functions to set a modified turbine inlet temperature (MTIT) or the modified turbine inlet temperature-equivalent control variable (MCLCSO) in the predetermined operation (actual operation) mode on the basis of the first interpolated data 101a and the second interpolated data 101b output from the turbine inlet temperature-equivalent control variable setting section 101. Specifically, using the specific parameter, the control variable interpolation section 103 calculates the modified turbine inlet temperature (MTIT) or the modified turbine inlet temperature-equivalent control variable (MCLCSO) from the first interpolated data 101a on the first operation mode and the second interpolated data 101b on the second operation mode. One example of the specific parameter is the casing pressure ratio (CPR).

To calculate the modified turbine inlet temperature (MTIT) or the modified turbine inlet temperature-equivalent control variable (MCLCSO) in the predetermined operation mode, the linear interpolation or extrapolation method of Embodiment 2 described using FIG. 11 can be applied. In the case where FIG. 11 of Embodiment 2 is applied to this embodiment, the turbine inlet temperature-equivalent control variable (CLCSO) on the vertical axis may be substituted by the turbine inlet temperature (TIT). Instead of the casing pressure ratio (CPR), other specific parameters may be used as the specific parameter. The calculated modified turbine inlet temperature (MTIT) or the modified turbine inlet temperature-equivalent control variable (MCLCSO) is output to a fuel distribution calculation section 104.

In the fuel distribution calculation section 104, the fuel distribution ratios FDRs related to the first fuel circuit 18 and the second fuel circuit 19 in the predetermined operation (actual operation) mode are calculated using the modified turbine inlet temperature (MTIT) or the modified turbine inlet temperature-equivalent control variable (MCLCSO) transmitted from the control variable interpolation section 103. The procedure of calculating the fuel distribution ratios FDRs is the same as that of Embodiment 1, and therefore the details thereof will be omitted. The calculated fuel distribution ratios FDRs for the first fuel circuit 18 and the second fuel circuit 19 are output to the fuel valve opening setting section 81 of the valve opening setting unit 80.

The fuel valve opening setting section 81 sets the valve openings of the pilot fuel regulating valve 23 of the first fuel circuit 18 and the main fuel regulating valve 24 of the second fuel circuit 19. The procedure of setting the valve opening of each valve is the same as that of Embodiment 1. The set valve opening command values PVS, MVS are output to the pilot fuel regulating valve 23 and the main fuel regulating valve 24.

Figure 14:
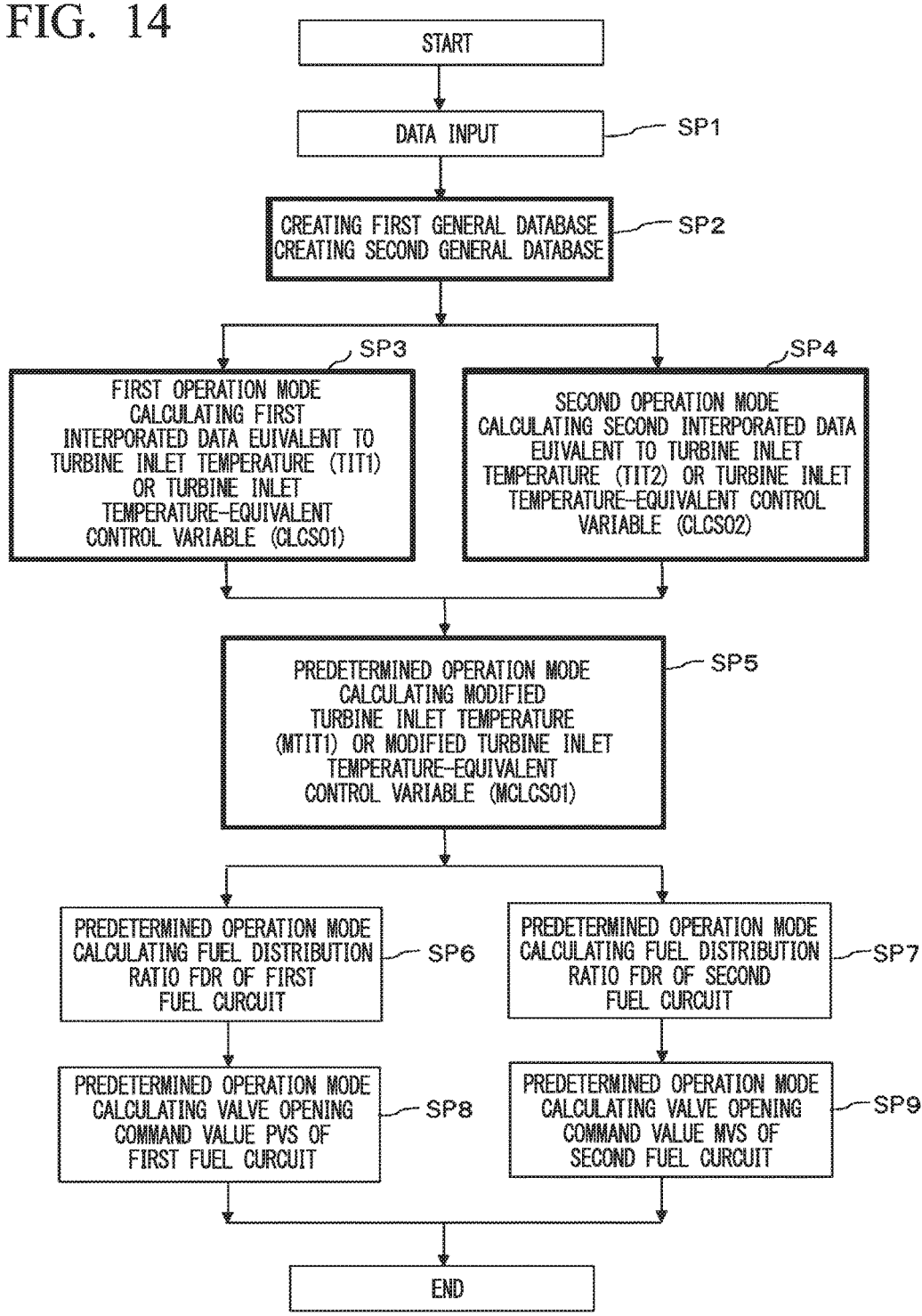
FIG. 14 is a view showing the process flow of a control method according to Embodiment 3.

Next, FIG. 14 shows the process flow of a control method according to Embodiment 3. The process flow that is different from the methods of Embodiment 1 and Embodiment 2 is indicated as thick-lined blocks. As described above, in this embodiment, the relations between the turbine inlet temperature (TIT) and the input data group are made into the databases on the first operation mode and the second operation mode (first general database 100a and second general database 100b). It is different from Embodiment 2 that the first interpolated data 101a and the second interpolated data 101b related to the turbine inlet temperature (TIT) or the turbine inlet temperature-equivalent control variable (CLCSO) are calculated using these databases, and that the modified turbine inlet temperature (MTIT) or the modified turbine inlet temperature-equivalent control variable (MCLCSO) is calculated from these pieces of data. The process flow is otherwise the same as that of Embodiment 2.

According to this embodiment, compared with Embodiment 1 and Embodiment 2, more stable combustion control can be realized. That is, in this embodiment, a wider range of measurement values, control values, and external command values than in Embodiment 1 and Embodiment 2 are incorporated and made into the databases. It is therefore possible to set the turbine inlet temperature (TIT) or the turbine inlet temperature-equivalent control variable (CLCSO) and determine the fuel valve openings with higher accuracy, so that an unstable combustion state is eliminated and the problems of $NO_x$, and combustion oscillation are eliminated.

Moreover, according to this embodiment, even when normal operation is switched to anti-icing operation, stable combustion control of the combustors is maintained, so that an increase in $NO_x$, etc. can be avoided and generation of combustion oscillation can be suppressed. As a result, stable operation of the gas turbine can be realized.

Furthermore, according to this embodiment, as in Embodiment 1 and Embodiment 2, it is possible to realize stable operation of the gas turbine while meeting emission regulation values of $NO_x$, CO, etc. even during turndown operation.

Embodiments to be described below relate to a combustion control device and combustion control method and program applied to gas turbines intended for turndown operation (partial load operation).

Turndown operation can widen the range of turndown (output lower limit value) by the bleed air circulation method shown in Embodiment 1 to Embodiment 3. Another method that can widen the range of turndown (output lower limit value) is a turbine bypass method in which part of casing air is extracted and discharged to a turbine downstream part (exhaust diffuser or exhaust duct 13) so as to bypass the combustors 3 and the turbine 4. Combining the bleed air circulation method and the turbine bypass method can further expand the range of turndown.

Aspects shown in Embodiment 4 and Embodiment 5 relate to a gas turbine combustion control device and combustion control method and program that allow turndown operation (partial load operation) by the turbine bypass method. Where Embodiment 1 to Embodiment 3 are referred to in the following description of the embodiments, anti-icing operation and the anti-icing command value (AID) can read as turndown operation and a turbine bypass command value (TBD), respectively.

The device configuration of the gas turbine in both Embodiment 4 and Embodiment 5 is the same as the configuration shown in FIG. 1, and therefore the same components will be denoted by the same names and reference signs while the detailed description thereof will be omitted. For the external command value input into the input unit 60, the turbine bypass command value (TBD) instead of the anti-icing command value (AID) is used. In the case of Embodiment 4 and Embodiment 5, the configuration may be such that bleed air is not circulated and accordingly the bleed air pipe 12 and the air bleed valve 22 are not provided.

Embodiment 4

Embodiment 4 for turndown operation will be described with reference to FIG. 15 to FIG. 17.

In this embodiment, a first database 150a related to the first operation mode and a third database 150b related to a third operation mode are prepared; a modified turbine inlet temperature-equivalent control variable (MCLCSO2) in a predetermined operation (actual operation) mode during turndown operation is calculated from these databases; and the valve openings of the fuel valves are set on the basis of the modified turbine inlet temperature-equivalent control variable (MCLCSO2).

Figure 15:
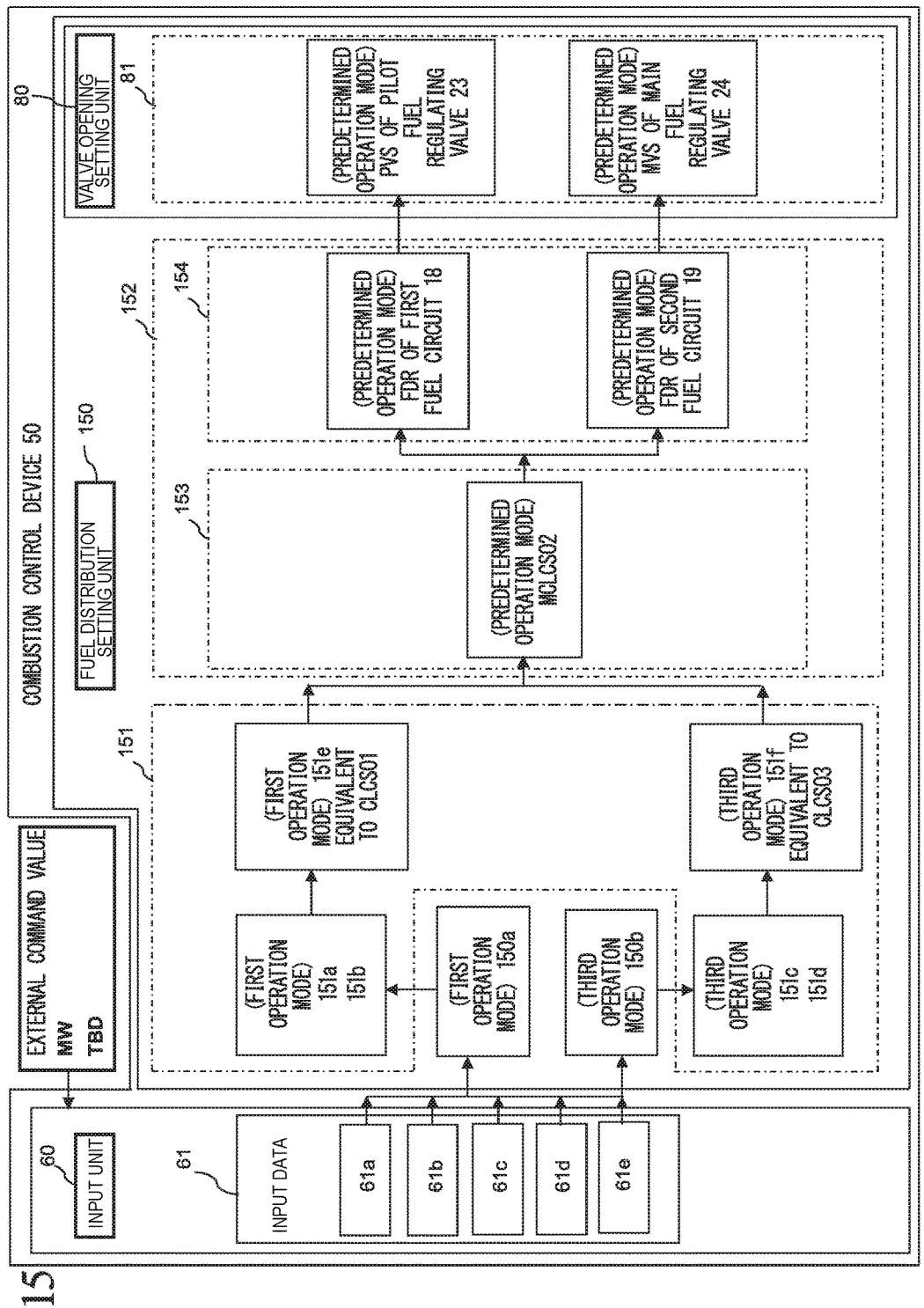
FIG. 15 is a view showing the device configuration of a combustion control device according to Embodiment 4 and data handled by the combustion control device.

In FIG. 15, as preparation, the first database 150a related to the first operation mode and the third database 150b related to the third operation mode are created of the relations between the control parameters and the turbine output (generator output MW) in a fuel distribution setting unit 150 on the basis of the input data 61 on the measurement values and the external command values (output command value (MW) and turbine bypass command value (TBD)) output from the input unit 60. The configuration of each database in this embodiment is the same as in Embodiment 1.

The configuration of the combustion control device 50 in this embodiment is the same as the configuration of Embodiment 2 except that the third database 150b for turndown operation is used instead of the second database 90b for anti-icing operation. The configuration of the first database 150a in this embodiment is substantially the same as the first database 90a in Embodiment 2.

The turbine inlet temperature-equivalent control variable setting section 151 functions to calculate the turbine inlet temperature-equivalent control variables (CLCSO1, CLCSO3) related to the first operation mode and the third operation mode.

Next, first interpolated data 151e equivalent to a turbine inlet temperature-equivalent control variable (CLCSO1) in the first operation mode is calculated from the first interpolated output data 151a and the second interpolated output data 151b related to the first operation mode. Third interpolated data 151f equivalent to a turbine inlet temperature-equivalent control variable (CLCSO3) in the third operation mode is calculated from fifth interpolated output data 151c and sixth interpolated output data 151d related to the third operation mode. The calculated first interpolated data 151e and third interpolated data 151f are output to a control variable interpolation section 153 of a fuel distribution correction section 152.

The fuel distribution correction section 152 includes the control variable interpolation section 153 that calculates the modified turbine inlet temperature-equivalent control variable (MCLCSO2) by correcting the turbine inlet temperature-equivalent control variables (CLCSO1, CLCSO3) calculated in the turbine inlet temperature-equivalent control variable setting section 151, and a fuel distribution calculation section 154 that sets the fuel distribution ratios FDRs for the fuel circuits 18, 19 from the modified turbine inlet temperature-equivalent control variable (MCLCSO2).

The control variable interpolation section 153 functions to calculate the modified turbine inlet temperature-equivalent control variable (MCLCSO2) in the predetermined operation (actual operation) mode on the basis of the first interpolated data 151e equivalent to the turbine inlet temperature-equivalent control variable (CLCSO1) related to the first operation mode and the third interpolated data 151f equivalent to the turbine inlet temperature-equivalent control variable (CLCSO3) related to the third operation mode, both transmitted from the turbine inlet temperature-equivalent control variable setting section 151.

The concept of calculating the modified turbine inlet temperature-equivalent control variable (MCLCSO2) for turndown operation is similar to the calculation method of the modified turbine inlet temperature-equivalent control variable (MCLCSO1) for anti-icing operation shown in Embodiment 2. FIG. 16 shows a relation between the turbine inlet temperature-equivalent control variable (CLCSO) and the casing pressure ratio (CPR) in each operation mode in the case where the casing pressure ratio is selected as the specific parameter. The vertical axis represents the turbine inlet temperature-equivalent control variable (CLCSO) and the horizontal axis represents the casing pressure ratio (CPR). Data on the first operation mode is data in the case where turndown operation is not performed, and data on the third operation mode is data in the case where a predetermined turbine bypass flow rate is set.

Figure 16:
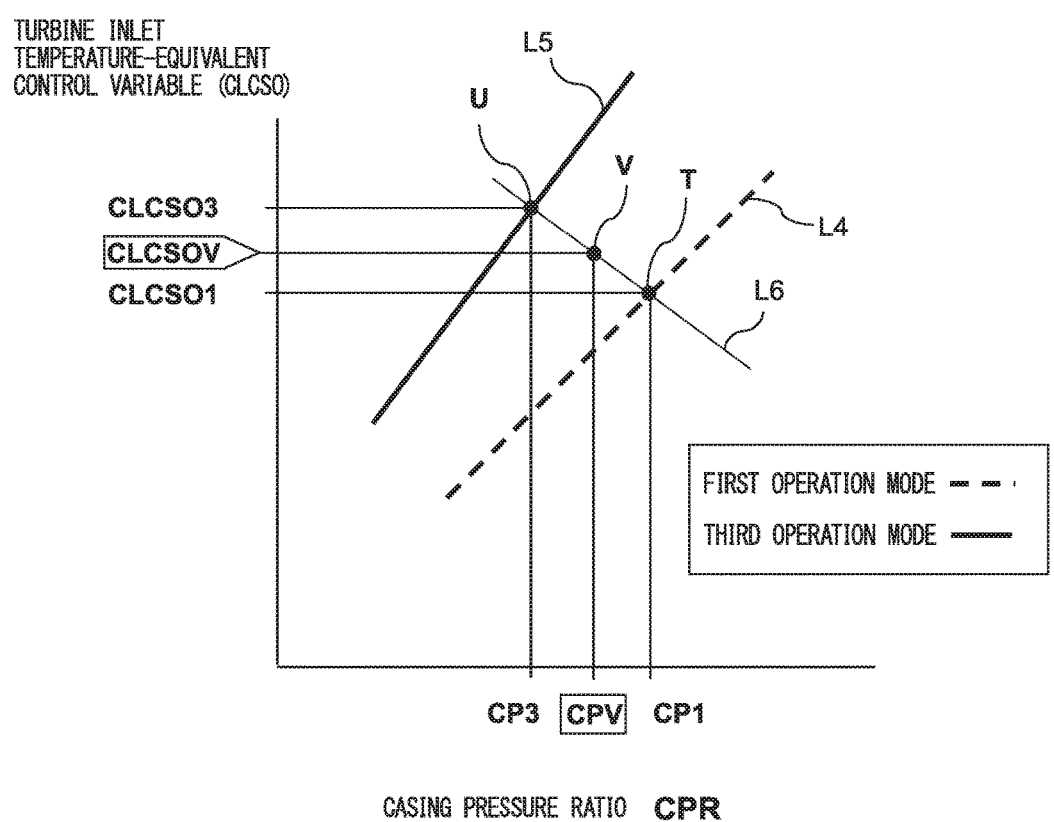
FIG. 16 is a view showing a relation between a turbine inlet temperature-equivalent control variable (CLCSO) and a casing pressure ratio in operation modes according to Embodiment 4.
Figure 17:
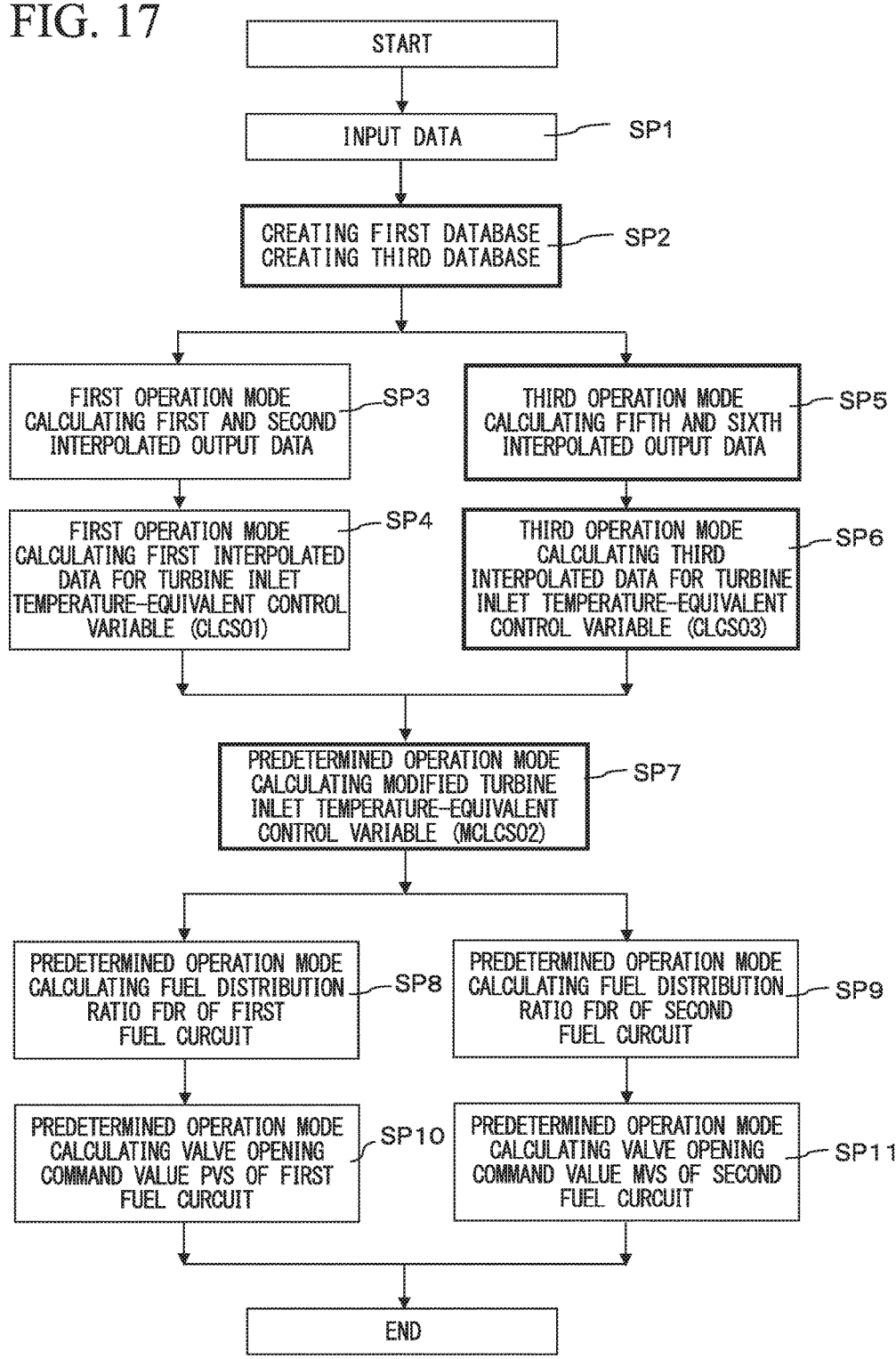
FIG. 17 is a view showing the process flow of a control method according to Embodiment 4.

As shown in FIG. 16, if the IGV opening is constant, the relation between the turbine inlet temperature-equivalent control variable (CLCSO) and the casing pressure ratio (CPR) in each mode is represented by a linear relation. While the casing pressure ratio (CPR) is taken here as an example of the specific parameter, the same concept is also applicable to the other specific parameters (the valve opening of the turbine bypass valve, the turbine bypass flow rate, etc.)

In FIG. 16, the first operation mode is indicated by the dashed line as the line L4, while the third operation mode is indicated by the solid line as the line L5. In turndown operation, part of the casing air is extracted and discharged to the turbine downstream part so as to bypass the turbine, so that the casing pressure decreases and the fuel-air ratio inside the combustors increases. This concept is the same as in the case of anti-icing operation shown in Embodiment 2.

In FIG. 16, the casing pressure ratio in the first operation mode and the casing pressure ratio in the third operation mode are denoted by CP1, CP3, respectively, and the turbine inlet temperature-equivalent control variables (CLCSOs) in the first and third operation modes are denoted by CLCSO1, CLCSO3, respectively. When the point on the line L4 corresponding to the casing pressure ratio in the first operation mode (CP1) is referred to as a point T and the point on the line L5 corresponding to the casing pressure ratio in the third operation mode (CP3) is referred to as a point U, the turbine inlet temperature-equivalent control variables corresponding to the points T, U are equivalent to CLCSO1, CLCSO3.

Next, the casing pressure ratio in the predetermined operation (actual operation) mode is denoted by CPV, and the point on the line L6, which connects the points T, U on the lines L4, L5, corresponding to the casing pressure ratio CPV is referred to as a point V. When the turbine inlet temperature-equivalent control variable corresponding to the point V is denoted by CLCSOV, CLCSOV is equivalent to the modified turbine inlet temperature-equivalent control variable (MCLCSO2) in the predetermined operation (actual operation) mode. Thus, the relation among the turbine inlet temperature-equivalent control variables CLCSO1, CLCSO3, CLCSOV and the casing pressure ratios CP1, CP3, CPV is expressed by the following formula (3):

$$CLCSOV=CLCSO1+(CLCSO3-CLCSO1)\times(CPV-CP1)/(CP3-CP1) \quad (3)$$

It is possible to calculate the turbine inlet temperature-equivalent control variable (CLCSOV) in the predetermined operation (actual operation) mode, from the casing pressure ratio in the first operation mode (CP1), the casing pressure ratio in the third operation mode (CP3), and the casing pressure ratio in the predetermined operation (actual operation) mode (CPV), by linear interpolation or extrapolation with the turbine inlet temperature-equivalent control variables in the first operation mode and the third operation mode (CLCSO1, CLCSO3). This turbine inlet temperature-equivalent control variable (CLCSOV) is equivalent to the modified turbine inlet temperature-equivalent control variable (MCLCSO2) in the predetermined operation (actual operation) mode during turndown operation.

Next, in the fuel distribution calculation section 154, the fuel distribution ratios FDRs related to the first fuel circuit 18 and the second fuel circuit 19 in the predetermined operation mode are calculated using the modified turbine inlet temperature-equivalent control variable (MCLCSO2) calculated in the control variable interpolation section 153. The calculation procedure of the fuel distribution ratios FDRs is the same as the method of Embodiment 1 described with reference to FIG. 5, and therefore the details thereof will be omitted. The calculated fuel distribution ratios FDRs for the first fuel circuit 18 and the second fuel circuit 19 are output to the fuel valve opening setting section 81 of the valve opening setting unit 80.

In the fuel valve opening setting section 81, the valve openings of the pilot fuel regulating valve 23 of the first fuel circuit 18 and the main fuel regulating valve 24 of the second fuel circuit 19 are set. The setting procedure of the valve opening of each valve is the same as that of Embodiment 1. The determined valve openings are output to the pilot fuel regulating valve 23 and the main fuel regulating valve 24. When the top-hat fuel regulating valve (not shown) is used, the valve opening can be set by the same procedure as with the pilot fuel regulating valve.

Next, the process flow of the control method according to this embodiment will be described on the basis of FIG. 17. The process flow that is different from the method of Embodiment 2 shown in FIG. 12 is indicated as thick-lined blocks in FIG. 17.

As in Embodiment 2, the measurement values, the various valve openings, and the external command values are transmitted to the input unit 60, and output as the input data 61 to the fuel distribution setting unit 150 (SP1).

Next, as a preparatory processing task, the databases (150a, 150b) are created of the relations between the control parameters and the turbine output (generator output MW) in the fuel distribution setting unit 150 (SP2). The databases related to the first operation mode and the third operation mode will be referred to as the first database 150a and the third database 150b, respectively. In this embodiment, the casing pressure ratio (CPR) is shown as a typical example of the specific parameter to be selected, but other specific parameters can also be used as in Embodiment 2.

Next, the first interpolated output data 151a on no load operation and the second interpolated output data 151b on rated load operation are calculated using the first database 150a on the first operation mode (SP3). Then, the first interpolated data 151e equivalent to the turbine inlet temperature-equivalent control variable (CLCSO1) in the first operation mode is calculated on the basis of the first interpolated output data 151a and the second interpolated output data 151b (SP4). The procedure of calculating the turbine inlet temperature-equivalent control variable (CLCSO) from the database is the same as the procedure described in Embodiment 1 and Embodiment 2.

Next, the fifth interpolated output data 151c on no load operation and the sixth interpolated output data 151d on rated load operation are calculated using the third database 150b on the third operation mode (SP5). Then, the third interpolated data 151f equivalent to the turbine inlet temperature-equivalent control variable (CLCSO3) in the third operation mode is calculated on the basis of the fifth interpolated output data 151c and the sixth interpolated output data 151d (SP6).

Next, the modified turbine inlet temperature-equivalent control variable (MCLCSO2) in the predetermined operation (actual operation) mode is calculated on the basis of the first interpolated data 151e on the first operation mode and the third interpolated data 151f on the third operation mode (SP7). The procedure of calculating the modified turbine inlet temperature-equivalent control variable (MCLCSO2) in the predetermined operation (actual operation) mode by interpolation or extrapolation based on the turbine inlet temperature-equivalent control variable (CLCSO1) and the casing pressure ratio (CP1) in the first operation mode and the turbine inlet temperature-equivalent control variable (CLCSO3) and the casing pressure ratio (CP3) in the third operation mode is the same as in Embodiment 2.

Next, the fuel distribution ratios FDRs for the first fuel circuit 18 and the second fuel circuit 19 are calculated on the basis of the modified turbine inlet temperature-equivalent control variable (MCLCSO2) in the predetermined operation (actual operation) mode (SP8, SP9). The valve openings PVS, MVS of the pilot fuel regulating valve 23 of the first fuel circuit 18 and the main fuel regulating valve 24 of the second fuel circuit 19 can be selected on the basis of the calculated fuel distribution ratios FDRs for the first fuel circuit 18 and the second fuel circuit 19 (SP10, SP11).

According to the aspect of this embodiment, even when the turbine bypass flow rate increases after the gas turbine is switched from normal operation to turndown operation, the generator output is maintained and the turbine inlet temperature-equivalent control variable (CLCSO) is properly corrected, so that stable combustion control can be realized. Moreover, it is possible to realize stable operation of the gas turbine while meeting emission regulation values of $NO_x$, CO, etc. even during turndown operation.

Embodiment 5

Next, Embodiment 5 will be described with reference to FIG. 18.

In Embodiment 4, the relations between the turbine output (generator output MW) or the turbine inlet temperature and the control parameters are made into a database on the basis of the input data (input data group) 61 transmitted from the input unit 60, and the fuel distribution ratios for the fuel circuits and the valve openings are set on the basis of the database. Embodiment 5 is different from Embodiment 4 in that the relations between the turbine inlet temperature (TIT) and the input data 61 are made into a database without using any control parameter, and that the valve openings of the valves are set on the basis of the database.

While the configuration of the database in this embodiment is different from that of Embodiment 4, the basic concept of the method, in which a database related to the first operation mode and a database related to the third operation mode are prepared and a modified turbine inlet temperature or a modified turbine inlet temperature-equivalent control variable in the predetermined operation mode during turndown operation is calculated from the databases, is the same as that of Embodiment 4. Here, the turbine inlet temperature (TIT), other than the turbine inlet temperature-equivalent control variable (CLCSO), is included in the objects to be calculated from the databases, because the turbine inlet temperature (TIT) and the turbine inlet temperature-equivalent control variable (CLCSO) are proportional to each other as described above, and therefore the turbine inlet temperature-equivalent control variable (CLCSO) can be substituted by the turbine inlet temperature (TIT).

Figure 18:
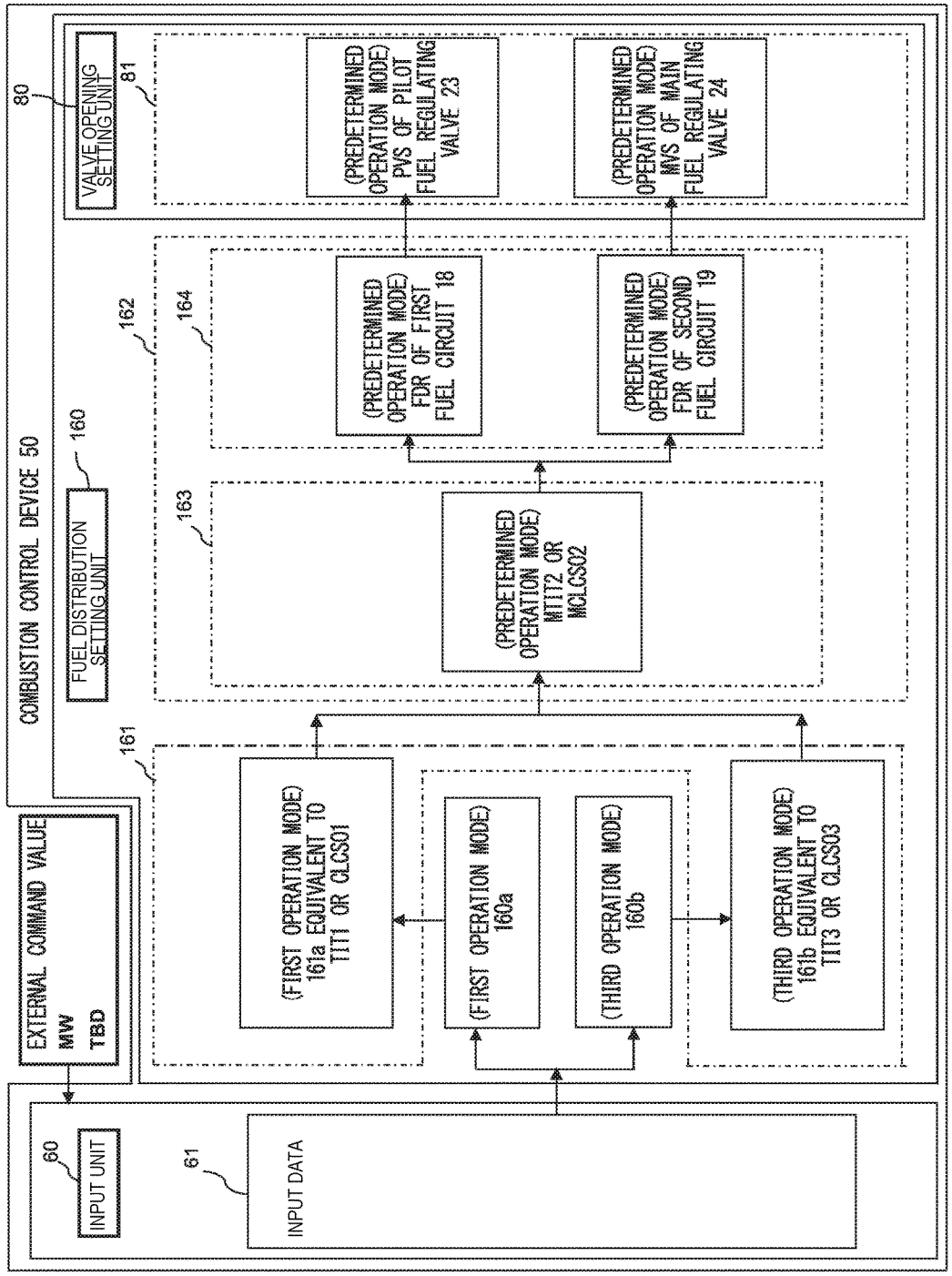
FIG. 18 is a view showing the device configuration of a combustion control device according to Embodiment 5 and data handled by the combustion control device.

In FIG. 18, as preparation, a first general database 160a related to the first operation mode and a third general database 160b related to the third operation mode are created of the relations between the turbine inlet temperature (TIT) and the input data 61 in a fuel distribution setting unit 160 on the basis of the input data 61 related to the measurement values, the control values, and the external command values output from the input unit 60.

A turbine inlet temperature-equivalent control variable setting section 161 functions to set first interpolated data 161a and third interpolated data 161b equivalent to the turbine inlet temperature (TIT) or the turbine inlet temperature-equivalent control variable (CLCSO) in the first operation mode and the third operation mode. Specifically, the turbine inlet temperature-equivalent control variable setting section 161 calculates the first interpolated data 161a equivalent to a turbine inlet temperature (TIT1) or the turbine inlet temperature-equivalent control variable (CLCSO1) in the first operation mode on the basis of the first general database 160a related to the first operation mode. Moreover, the turbine inlet temperature-equivalent control variable setting section 161 calculates the third interpolated data 161b equivalent to a turbine inlet temperature (TIT3) or the turbine inlet temperature-equivalent control variable (CLCSO3) in the third operation mode on the basis of the third general database 160b related to the third operation mode. Both pieces of data are output to a control variable interpolation section 163 of a fuel distribution correction section 162.

The control variable interpolation section 163 functions to set a modified turbine inlet temperature (MTIT2) or the modified turbine inlet temperature-equivalent control variable (MCLCSO2) in the predetermined operation (actual operation) mode on the basis of the first interpolated data 161a and the third interpolated data 161b output from the turbine inlet temperature-equivalent control variable setting section 161. Specifically, using the specific parameter, the control variable interpolation section 163 calculates the modified turbine inlet temperature (MTIT2) or the modified turbine inlet temperature-equivalent control variable (MCLCSO2) in the predetermined operation (actual operation) mode from the first interpolated data 161a on the first operation mode and the third interpolated data 161b on the third operation mode. One example of the specific parameter is the casing pressure ratio (CPR).

To calculate the modified turbine inlet temperature (MTIT2) or the modified turbine inlet temperature-equivalent control variable (MCLCSO2) in the predetermined operation mode, the linear interpolation or extrapolation method of Embodiment 4 can be used. In the case where FIG. 16 of Embodiment 4 is applied to this embodiment, the turbine inlet temperature-equivalent control variable (CLCSO) on the vertical axis may be substituted by the turbine inlet temperature (TIT). Instead of the casing pressure ratio (CPR), other specific parameters may be used as the specific parameter. The calculated modified turbine inlet temperature (MTIT2) or modified turbine inlet temperature-equivalent control variable (MCLCSO2) is output to a fuel distribution calculation section 164.

In the fuel distribution calculation section 164, the fuel distribution ratios FDRs related to the first fuel circuit 18 and the second fuel circuit 19 in the predetermined operation (actual operation) mode are calculated using the modified turbine inlet temperature (MTIT2) or the modified turbine inlet temperature-equivalent control variable (MCLCSO2) transmitted from the control variable interpolation section 163. The procedure of calculating the fuel distribution ratios FDRs is the same as that of Embodiment 4. The calculated fuel distribution ratios FDRs for the first fuel circuit 18 and the second fuel circuit 19 are output to the fuel valve opening setting section 81 of the valve opening setting unit 80.

The fuel valve opening setting section 81 sets the valve openings of the pilot fuel regulating valve 23 of the first fuel circuit 18 and the main fuel regulating valve 24 of the second fuel circuit 19. The procedure of setting the valve opening of each valve is the same as that of Embodiment 4. The set valve opening command values PVS, MVS are output to the pilot fuel regulating valve 23 and the main fuel regulating valve 24.

Next, FIG. 19 shows the process flow of the control method according to this embodiment. The process flow that is different from the method of Embodiment 4 is indicated as thick-lined blocks. As described above, in this embodiment, the relations between the turbine inlet temperature (TIT) and the input data group are made into the databases on the first operation mode and the third operation mode (first general database 160a and third general database 160b). It is different from Embodiment 4 that the first interpolated data 161a and the third interpolated data 161b related to the turbine inlet temperature (TIT) or the turbine inlet temperature-equivalent control variable (CLCSO) are calculated using these databases, and that the modified turbine inlet temperature (MTIT2) or the modified turbine inlet temperature-equivalent control variable (MCLCSO2) is calculated from these pieces of data. The process flow is otherwise the same as that of Embodiment 4.

According to this embodiment, compared with Embodiment 4, more stable combustion control can be realized even during turndown operation. In this embodiment, a wider range of measurement values, control values, and external command values than in Embodiment 4 are incorporated and made into the databases. It is therefore possible to set the turbine inlet temperature (TIT) or the turbine inlet temperature-equivalent control variable (CLCSO) and determine the fuel valve openings with higher accuracy, so that an unstable combustion state is eliminated and the problems of $NO_x$ and combustion oscillation are eliminated.

According to this embodiment, even when normal operation is switched to turndown operation, stable combustion control of the combustors is maintained, so that an increase in $NO_x$ etc. can be avoided and generation of combustion oscillation can be suppressed. As a result, stable operation of the gas turbine can be realized. Moreover, it is possible to realize stable operation of the gas turbine while meeting emission regulation values of $NO_x$, CO, etc. even during turndown operation.

INDUSTRIAL APPLICABILITY

According to the gas turbine combustion control device and the combustion control method and program of the present invention, even when normal operation is switched to anti-icing operation or turndown operation, stable combustion control of the combustors is maintained, so that an increase in $NO_x$ etc. can be avoided and generation of combustion oscillation can be suppressed. As a result, stable operation of the gas turbine can be realized. Moreover, it is possible to realize stable operation while meeting emission regulation values even during turndown operation (partial load operation).

REFERENCE SIGNS LIST

1 Gas turbine
2 Compressor
3 Combustor
4 Turbine
5 Generator
6 Casing
7 Air intake facility
8 Rotating shaft
11 Air intake duct
12 Bleed air pipe
13 Exhaust duct
14 Turbine bypass pipe
15 Pilot nozzle
16 Main nozzle
17 Fuel main circuit
18 First fuel circuit
19 Second fuel circuit
20 Inlet guide vane (IGV)
21 IGV driving unit
22 Air bleed valve
23 Pilot fuel regulating valve
24 Main fuel regulating valve
25 Turbine bypass valve
30 Casing temperature indicator
31 Casing pressure indicator
32 Atmospheric temperature indicator
33 Atmospheric pressure indicator
34 Intake air temperature indicator
35 Intake air pressure indicator
36 Bleed air flowmeter
37 Fuel flowmeter
38 Fuel temperature indicator
39 Waste gas temperature indicator
40 Generator output detection unit
50 Combustion control device
60 Input unit
61 Input data
61a Generator output
61b IGV opening
61c Intake air temperature
61d Intake air flow rate
61e Turbine bypass flow rate
61f, ΔT Intake air temperature difference
61g Atmospheric temperature
61h, CPR Casing pressure ratio
61i Amount of bleed air
61j Intake air pressure
61k Atmospheric pressure
61m Air bleed valve opening
61p Casing pressure
70, 90, 100 Fuel distribution setting unit
80 Valve opening setting unit
70a, 90a, 90b, 100a, 100b Database
71 Interpolated output data calculation section
71a, 91a First interpolated output data
71b, 91b Second interpolated output data
72 Interpolated output data correction section
73 Correction factor calculation section
74 Interpolated output data modification section
74a First modified interpolated output data
74b Second modified interpolated output data
75 Control variable calculation section
76, 94, 104 Fuel distribution calculation section
81 Fuel valve opening setting section
91, 101 Turbine inlet temperature-equivalent control variable setting section
91c Third interpolated output data
91d Fourth interpolated output data
91e, 101a First interpolated data
91f, 101b Second interpolated data
92, 102 Fuel distribution correction section
93, 103 Control variable interpolation section
AID Anti-icing command value
MW Turbine output command value
F Output correction factor
FDR Fuel distribution ratio
PR Pilot ratio
TIT Turbine inlet temperature
MTIT Modified turbine inlet temperature
CLCSO Turbine inlet temperature-equivalent control variable
MCLCSO Modified turbine inlet temperature-equivalent control variable

The invention claimed is:

1. A gas turbine combustion control device that is installed in a gas turbine including:
a compressor having inlet guide vanes;
a combustor having a plurality of fuel nozzles;
a turbine;
a turbine bypass pipe through which compressed air from a casing is discharged to a turbine downstream part so as to bypasses the turbine; and
a turbine bypass valve that is mounted on the turbine bypass pipe and regulates a turbine bypass flow rate of the compressed air,
the gas turbine combustion control device being configured to set fuel distribution ratios for fuel circuits of fuel supplied to the combustor and being operable to perform:
a fuel distribution setting that sets a turbine inlet temperature or a turbine inlet temperature-equivalent control variable computed on the basis of input data, and sets the fuel distribution ratios on the basis of the turbine inlet temperature or the turbine inlet temperature-equivalent control variable; and
a valve opening setting that sets the valve openings of fuel regulating valves provided in the fuel circuits on the basis of the fuel distribution ratios,
wherein in the fuel distribution setting the fuel distribution ratios are modified on the basis of the turbine bypass flow rate of the compressed air.

2. The gas turbine combustion control device according to claim 1, wherein the gas turbine combustion control device is further operable to perform:
a turbine inlet temperature-equivalent control variable setting that calculates first interpolated data equivalent to the turbine inlet temperature or the turbine inlet temperature-equivalent control variable in a first operation mode that is a normal operation mode of the gas turbine, and second interpolated data equivalent to the turbine inlet temperature or the turbine inlet temperature-equivalent control variable in a second operation mode that is a turndown operation mode in which a predetermined turbine bypass flow rate is set and part of casing air is discharged to the turbine downstream part so as to bypass the turbine; and a fuel distribution correction that, using the first interpolated data and the second interpolated data, modifies the fuel distribution ratios in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part.

3. The gas turbine combustion control device according to claim 2, wherein the gas turbine combustion control device is further operable to perform:

a control variable interpolation that, using the first interpolated data and the second interpolated data, calculates a modified turbine inlet temperature or a modified turbine inlet temperature-equivalent control variable in the predetermined operation mode on the basis of the specific parameter; and a fuel distribution calculation that calculates the fuel distribution ratios for the respective fuel circuits on the basis of the modified turbine inlet temperature or the modified turbine inlet temperature-equivalent control variable.

4. The gas turbine combustion control device according to claim 2, wherein the gas turbine combustion control device is further operable to:

calculate first interpolated output data related to an output during no load operation in the first operation mode and second interpolated output data related to an output during rated load operation in the first operation mode;

calculate first interpolated data equivalent to the turbine inlet temperature-equivalent control variable in the first operation mode using the first interpolated output data and the second interpolated output data;

calculate third interpolated output data related to an output during no load operation in the second operation mode and fourth interpolated output data related to an output during rated load operation in the second operation mode; and calculate second interpolated data equivalent to the turbine inlet temperature-equivalent control variable in the second operation mode using the third interpolated output data and the fourth interpolated output data.

5. The gas turbine combustion control device according to claim 3, wherein the gas turbine combustion control device is further operable to:

calculate first interpolated output data related to an output during no load operation in the first operation mode and second interpolated output data related to an output during rated load operation in the first operation mode;

calculate first interpolated data equivalent to the turbine inlet temperature-equivalent control variable in the first operation mode using the first interpolated output data and the second interpolated output data;

calculate third interpolated output data related to an output during no load operation in the second operation mode and fourth interpolated output data related to an output during rated load operation in the second operation mode; and calculate second interpolated data equivalent to the turbine inlet temperature-equivalent control variable in the second operation mode using the third interpolated output data and the fourth interpolated output data.

6. The gas turbine combustion control device according to claim 2, wherein the specific parameter is one of a casing pressure ratio, the turbine bypass flow rate, and the valve opening of the turbine bypass valve.

7. The gas turbine combustion control device according to claim 3, wherein the specific parameter is one of a casing pressure ratio, the turbine bypass flow rate, and the valve opening of the turbine bypass valve.

8. A gas turbine combustion control method for a gas turbine including:

a compressor having inlet guide vanes;

a combustor having a plurality of fuel nozzles;

a turbine;

a turbine bypass pipe through which compressed air from a casing is discharged to a turbine downstream part so as to bypass the turbine;

a turbine bypass valve that is mounted on the turbine bypass pipe and regulates a turbine bypass flow rate of the compressed air; and a gas turbine combustion control device configured to set fuel distribution ratios for circuits of fuel supplied to the combustor, the gas turbine combustion control method comprising the steps of:

calculating first interpolated data equivalent to a turbine inlet temperature or a turbine inlet temperature-equivalent control variable in a first operation mode computed on the basis of input data on the first operation mode that is a normal operation mode of the gas turbine;

calculating second interpolated data equivalent to a turbine inlet temperature or a turbine inlet temperature-equivalent control variable in a second operation mode computed on the basis of input data on the second operation mode that is a turndown operation mode in which a predetermined turbine bypass flow rate is set and part of casing air is discharged to the turbine downstream part so as to bypass the turbine;

using the first interpolated data and the second interpolated data, calculating a modified turbine inlet temperature or a modified turbine inlet temperature-equivalent control variable in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part;

calculating fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

9. A gas turbine combustion control method for a gas turbine including:

a compressor having inlet guide vanes;

a combustor having a plurality of fuel nozzles;

a turbine;

a turbine bypass pipe through which compressed air from a casing is discharged to a turbine downstream part so as to bypass the turbine;

a turbine bypass valve that is mounted on the turbine bypass pipe and regulates a turbine bypass flow rate of the compressed air; and a gas turbine combustion control device configured to set fuel distribution ratios for circuits of fuel supplied to the combustor, the gas turbine combustion control method comprising the steps of:

creating a database on the basis of input data on a first operation mode that is a normal operation mode of the gas turbine, and a database on the basis of input data on a second operation mode that is a turndown operation mode in which a predetermined turbine bypass flow rate is set and part of casing air is discharged to the turbine downstream part so as to bypass the turbine;

calculating first interpolated data equivalent to a turbine inlet temperature or a turbine inlet temperature-equivalent control variable in the first operation mode on the basis of the database;

calculating second interpolated data equivalent to a turbine inlet temperature or a turbine inlet temperature-equivalent control variable in the second operation mode on the basis of the database;

using the first interpolated data and the second interpolated data, calculating a modified turbine inlet temperature or a modified turbine inlet temperature-equivalent control variable in a predetermined operation mode on the basis of a specific parameter determined by the turbine bypass flow rate in the predetermined operation mode that is a turndown operation mode in which a turbine bypass flow rate required for turndown operation is selected according to an operation state of the gas turbine and part of the casing air is discharged to the turbine downstream part;

calculating fuel distribution ratios for the respective fuel circuits in the predetermined operation mode on the basis of the modified turbine inlet temperature or the modified turbine inlet temperature-equivalent control variable; and setting valve openings for the respective fuel circuits on the basis of the fuel distribution ratios.

10. The gas turbine combustion control method according to claim 8, wherein the specific parameter is one of a casing pressure ratio, the turbine bypass flow rate, and the valve opening of the turbine bypass valve.

11. The gas turbine combustion control method according to claim 9, wherein the specific parameter is one of a casing pressure ratio, the turbine bypass flow rate, and the valve opening of the turbine bypass valve.

12. A non-transitory recording medium that readably stores a program that, when executed by a computer, performs the gas turbine combustion control method according to claim 8.

13. A non-transitory recording medium that readably stores a program that, when executed by a computer, performs the gas turbine combustion control method according to claim 9.

* * * * *